(12) United States Patent
Qi et al.

(10) Patent No.: US 12,279,038 B2
(45) Date of Patent: Apr. 15, 2025

(54) SERVICE PROCESSING METHOD AND DEVICE

(71) Applicant: HUAWEI TECHNOLOGIES CO., LTD., Guangdong (CN)

(72) Inventors: Shengwang Qi, Shanghai (CN); Yizhen Wu, Shanghai (CN); Junwei Gou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 18/043,266

(22) PCT Filed: Jul. 30, 2021

(86) PCT No.: PCT/CN2021/109923
§ 371 (c)(1),
(2) Date: Feb. 27, 2023

(87) PCT Pub. No.: WO2022/042211
PCT Pub. Date: Mar. 3, 2022

(65) Prior Publication Data
US 2023/0319395 A1    Oct. 5, 2023

(30) Foreign Application Priority Data
Aug. 31, 2020    (CN) .......................... 202010901750.1

(51) Int. Cl.
*H04N 23/60* (2023.01)
*G06F 3/01* (2006.01)
(Continued)

(52) U.S. Cl.
CPC ............. *H04N 23/64* (2023.01); *G06F 3/013* (2013.01); *G06F 3/017* (2013.01); *G06V 10/60* (2022.01);
(Continued)

(58) Field of Classification Search
CPC .. G06V 10/60; G06V 40/161; G06V 2201/07; G06F 3/013; G06F 3/017;
(Continued)

(56) References Cited

U.S. PATENT DOCUMENTS 10,986,264 B2 * 4/2021 Ejiri .................... H04N 23/611
12,130,966 B2 * 10/2024 Hu ........................ G06F 30/017
(Continued)

FOREIGN PATENT DOCUMENTS

| CN | 103106374 A | 5/2013 |
|---|---|---|
| CN | 105759935 A | 7/2016 |

(Continued)

OTHER PUBLICATIONS

Extended European Search Report in European Appln No. 21860051.8, dated Jan. 31, 2024, 10 pages.
(Continued)

*Primary Examiner* — Marly S Camargo
(74) *Attorney, Agent, or Firm* — Fish & Richardson P.C.

(57) ABSTRACT

This disclosure provides service processing methods and apparatuses. In an implementation, a method includes, after a target camera is enabled, capturing, based on a first image output specification, an image for processing a first service, and after the second service starts, capturing, based on a second image output specification, an image for processing a second service, wherein the second image output specification is higher than the first image output specification, and wherein the second service comprises photographing, video recording, or video calling.

19 Claims, 19 Drawing Sheets

(51) Int. Cl.
*G06V 10/60* (2022.01)
*G06V 40/16* (2022.01)
*H04N 23/65* (2023.01)
*H04N 23/66* (2023.01)

(52) U.S. Cl.
CPC ........ *G06V 40/161* (2022.01); *G06V 2201/07* (2022.01)

(58) Field of Classification Search
CPC ...... H04N 23/64; H04N 23/65; H04N 23/651; H04N 23/667; H04N 13/383
See application file for complete search history.

(56) References Cited

U.S. PATENT DOCUMENTS

| | | | | |
|---|---|---|---|---|
| 2019/0158730 | A1* | 5/2019 | Ejiri | H04N 23/611 |
| 2019/0272625 | A1* | 9/2019 | Lim | G06F 18/24 |
| 2024/0171701 | A1* | 5/2024 | Wang | H04N 23/633 |
| 2024/0386745 | A1* | 11/2024 | Li | G06V 40/161 |

FOREIGN PATENT DOCUMENTS

| | | | | |
|---|---|---|---|---|
| CN | 107172345 | A * | 9/2017 | ........ H04N 23/667 |
| CN | 107657167 | A | 2/2018 | |
| CN | 107909686 | A | 4/2018 | |
| CN | 110297665 | A | 10/2019 | |
| CN | 110866511 | A | 3/2020 | |
| CN | 110968205 | A | 4/2020 | |
| CN | 112351194 | A | 2/2021 | |

OTHER PUBLICATIONS

International Search Report and Written Opinion in International Appln. No. PCT/CN2021/109923, mailed on Oct. 25, 2021, 21 pages (with English translation).

* cited by examiner

ALS mode

SERVICE PROCESSING METHOD AND DEVICE

CROSS-REFERENCE TO RELATED APPLICATIONS

This application is a National Stage of International Application No. PCT/CN2021/109923, filed on Jul. 30, 2021, which claims priority to Chinese Patent Application No. 202010901750.1, filed on Aug. 31, 2020. Both of the aforementioned applications are hereby incorporated by reference in their entireties.

TECHNICAL FIELD

Embodiments of this application relate to the field of terminal artificial intelligence (artificial intelligence, AI) intelligent perception, and in particular, to a service processing method and a device.

BACKGROUND

With development of electronic technologies, an electronic device such as a mobile phone, a tablet computer, or a watch has increasingly powerful functions. To support a low-power service sensing function, more electronic devices start to integrate a first low-power sensing sensor to capture sensing information such as human body and/or environment information, so as to perform low-power sensing service processing (for example, gesture or face detection).

In the conventional technology, as shown in FIG. 1, an electronic device captures sensing information in real time by adding a first low-power sensing sensor (for example, a gesture sensor (gesture sensor) or a radar sensor) on the top. Consequently, hardware costs of the electronic device are high. In addition, a component such as a camera is on the top of the electronic device, and therefore the addition of the first low-power sensing sensor affects aesthetics and a screen-to-body ratio of the electronic device, and increases difficulty in designing and manufacturing the electronic device.

SUMMARY

Embodiments of this application provide a service processing method and a device, so that an existing camera of an electronic device can be multiplexed to implement a function of a first low-power sensing sensor, and no additional hardware of the first low-power sensing sensor is required. Therefore, costs of the electronic device and impact on product aesthetics and a screen-to-body ratio can be reduced, and design and manufacturing difficulties of the electronic device can be reduced.

To achieve the foregoing objectives, the following technical solutions are used in embodiments of this application.

According to an aspect, an embodiment of this application provides a service processing method, applied to an electronic device, where the electronic device includes a target camera. The method includes: After the target camera is enabled, the electronic device captures an image based on a first image output specification by using the target camera, where the image captured based on the first image output specification is used to process a first service. After a second service starts, the electronic device captures an image based on a second image output specification by using the target camera. The second image output specification is higher than the first image output specification, the image captured based on the second image output specification is used to process the second service, the second service includes photographing, video recording, or video calling, and the first service is different from the second service.

In this solution, after the target camera is enabled, the electronic device may capture an image by using the target camera by default based on the low first image output specification with low power consumption, so as to process the first service based on the image (the first service may be some services that always start with low power consumption, for example, face or gesture detection is always performed on the electronic device with low power consumption (which involves photographing based on a low image output specification, which is different from a daily photographing operation of a user), and then another service starts after a face or a specific gesture is detected). After a camera service such as photographing (for example, the daily photographing operation of the user), video recording, or video calling is enabled, the electronic device captures an image based on the high second image output specification with high power consumption by using the target camera, so as to process the camera service. In other words, the electronic device captures an image at low power consumption by default, and captures an image at high power consumption only when there is a camera service. Therefore, power consumption of the electronic device can be reduced as much as possible, and power of the electronic device can be saved.

In addition, the electronic device may multiplex an existing target camera in the electronic device to implement a function of a first low-power sensing sensor, without adding a piece of hardware of the first low-power sensing sensor, so that costs of the electronic device and impact on product aesthetics and a screen-to-body ratio can be reduced, and design and manufacturing difficulties of the electronic device can be reduced.

For example, the first service may be a low-power sensing service, which refers to a sensing service processed in a low power consumption state. For example, different responses are made by sensing different air gestures of the user in the low power consumption state, for example, sensing a gesture of waving to the left of the user to perform page down processing on screen content.

In a possible design, the method further includes: After the second service ends, the electronic device captures an image based on the first image output specification by using the target camera.

In other words, after the second service ends, the target camera may continue to capture the image based on the first image output specification with low power consumption, so as to reduce power consumption of the electronic device as much as possible and save power of the electronic device.

In another possible design, the method further includes: after the second service starts, the electronic device processes the image captured based on the second image output specification to obtain an image meeting a third image output specification, where the image meeting the third image output specification is used to process the first service, and the second image output specification is higher than the third image output specification.

In this solution, when processing the second service, the electronic device may further process the image captured by the target camera to obtain an image of a lower specification, so as to process the first service. To be specific, the electronic device may process the first service while processing the second service.

In another possible design, the third image output specification is the same as the first image output specification.

In other words, after the second service starts, a specification of the image obtained by processing, by the electronic device, the image captured based on the second image output specification is the same as a specification of an image captured by the electronic device when the second service does not start, and images of the same specification are all used to process the first service.

In another possible design, the first image output specification includes a sub-specification 1 and a sub-specification 2, the sub-specification 2 is higher than the sub-specification 1. That the electronic device captures an image based on a first image output specification by using the target camera includes: The electronic device captures the image based on the sub-specification 1 by using the target camera. If the electronic device determines, based on the image captured based on the sub-specification 1, that a first condition is met, the electronic device captures the image based on the sub-specification 2 by using the target camera.

In other words, the electronic device may capture an image based on the sub-specification 1 that is the lowest specification in the first image output specification by default, so as to reduce power consumption of the electronic device as much as possible; and switch to capture an image based on the sub-specification 2 that is a higher specification in the first image output specification only after the first condition is met.

In another possible design, the first condition includes: An image luminance change is greater than or equal to a preset threshold.

The electronic device does not need to start an image recognition algorithm when determining whether the image luminance change is greater than or equal to the preset threshold. Therefore, power consumption of the electronic device is low. In addition, in this solution, the electronic device captures an image based on the sub-specification 1 that is the lowest specification in the first image output specification by default, so as to reduce power consumption of the electronic device as much as possible. The electronic device switches to capture an image based on the sub-specification 2 that is the higher specification in the first image output specification only after the image luminance change is greater than or equal to the preset threshold.

In another possible design, the first image output specification further includes a sub-specification 3, and the sub-specification 3 is higher than the sub-specification 2. The method further includes: If the electronic device determines, based on the image captured based on the sub-specification 2, that a second condition is met, the electronic device captures an image based on the sub-specification 3 by using the target camera. Alternatively, if the electronic device determines, based on the image captured based on the sub-specification 2, that the second condition is not met, the electronic device captures the image based on the sub-specification 1 by using the target camera.

In other words, the electronic device may determine, based on the condition, whether to switch to a higher sub-specification or the lowest sub-specification to capture an image.

In another possible design, the second condition includes recognizing a first target object from the image.

In this solution, if the first target object is recognized from the image, it may indicate that the current scenario is a scenario that the first service is concerned with. The user may want to use the electronic device to process the first service. Therefore, the target camera may switch to a higher sub-specification, so as to frequently capture an image to perform image recognition more quickly and accurately, so as to determine, based on a recognition result, whether to trigger the first service. If the first target object is not recognized from the image, it may be considered that the current scenario is not a scenario that the first service is concerned with. Therefore, the target camera may switch to the lowest sub-specification to capture an image, to reduce power consumption of the electronic device. For example, the first target object includes a face, a hand, a scenic spot, or an object.

In another possible design, the method further includes: If the electronic device determines, based on the image captured based on the sub-specification 3, that a third condition is met, the electronic device continues to capture the image based on the sub-specification 3 by using the target camera. Alternatively, if the electronic device determines, based on the image captured based on the sub-specification 3, that the third condition is not met, the electronic device captures the image based on the sub-specification 2 or the sub-specification 1 by using the target camera.

In other words, the electronic device may determine, based on the condition, whether to switch to a lower sub-specification or the lowest sub-specification to capture an image.

In another possible design, the third condition includes recognizing a second target object from the image.

In this solution, if the second target object is recognized from the image, it may indicate that an object concerned by the first service currently appears, and the target camera maintains to output a high-specification image based on a current sub-specification, so as to perform first service processing. If the second target object is not recognized from the image, it may be considered that the object concerned by the first service does not appear currently, and the user may not want to trigger the first service. Therefore, the target camera may switch to a lower or the lowest sub-specification to capture an image, to reduce power consumption of the electronic device. For example, the second target object includes a preset gesture or a user gaze.

In another possible design, the third image output specification includes a sub-specification 4 and a sub-specification 5, and the sub-specification 5 is higher than the sub-specification 4. That the electronic device processes the image captured based on the second image output specification to obtain an image meeting a third image output specification includes: The electronic device performs first processing on the image captured based on the second image output specification to obtain an image meeting the sub-specification 4. If the electronic device determines, based on the image meeting the sub-specification 4, that a first condition is met, the electronic device performs second processing on an image subsequently captured based on the second image output specification to obtain an image meeting the sub-specification 5.

In other words, the electronic device may process, by default, the image captured based on the second image output specification to obtain an image meeting the sub-specification 4 that is the lowest specification, so as to reduce power consumption of the electronic device as much as possible. Only after the first condition is met, the electronic device switches to process the image captured based on the second image output specification to obtain an image meeting the sub-specification 5 that is a higher specification.

In another possible design, the first condition includes: An image luminance change is greater than or equal to a preset threshold.

The electronic device does not need to start an image recognition algorithm when determining whether the image luminance change is greater than or equal to the preset threshold. Therefore, power consumption of the electronic device is low. In addition, in this solution, the electronic device processes, by default, the image captured based on the second image output specification to obtain an image meeting the sub-specification 4 that is the lowest specification, so as to reduce power consumption of the electronic device as much as possible. The electronic device switches to process the image captured based on the second image output specification to obtain an image meeting the sub-specification 5 that is a higher specification only after the image luminance change is greater than or equal to the preset threshold.

In another possible design, the third image output specification further includes a sub-specification 6, and the sub-specification 6 is higher than the sub-specification 5. That the electronic device processes the image captured based on the second image output specification to obtain an image meeting a third image output specification further includes: If the electronic device determines, based on the image meeting the sub-specification 5, that a second condition is met, the electronic device performs third processing on an image subsequently captured based on the second image output specification to obtain an image meeting the sub-specification 6. Alternatively, if the electronic device determines, based on the image meeting the sub-specification 5, that the second condition is not met, the electronic device performs first processing on an image subsequently captured based on the second image output specification to obtain an image meeting the sub-specification 4.

In other words, the electronic device may determine, based on the condition, whether to process an image subsequently captured based on the second image output specification to obtain an image meeting a higher sub-specification or the lowest sub-specification.

In another possible design, the second condition includes recognizing a first target object from the image.

In this solution, if the first target object is recognized from the image, it may indicate that the current scenario is a scenario that the first service is concerned with. The user may want to use the electronic device to process the first service. Therefore, the third image output specification may be switched to a higher sub-specification, so as to perform image recognition more quickly and accurately, so as to determine, based on a recognition result, whether to trigger the first service. If the first target object is not recognized from the image, it may be considered that the current scenario is not a scenario that the first service is concerned with. Therefore, the third image output specification may be switched to the lowest sub-specification, to reduce power consumption of the electronic device. For example, the first target object includes a face, a hand, a scenic spot, or an object.

In another possible design, that the electronic device processes the image captured based on the second image output specification to obtain an image meeting a third image output specification further includes: If the electronic device determines, based on the image meeting the sub-specification 6, that a third condition is met, the electronic device continues to perform third processing on an image subsequently captured based on the second image output specification to obtain an image meeting the sub-specification 6. Alternatively, if the electronic device determines, based on the image meeting the sub-specification 6, that the third condition is not met, the electronic device performs second processing on the image subsequently captured based on the second image output specification to obtain an image meeting the sub-specification 5 or performs first processing on the image subsequently captured based on the second image output specification to obtain an image meeting the sub-specification 4.

In other words, the electronic device may determine, based on the condition, whether to process an image subsequently captured based on the second image output specification to obtain an image meeting a lower sub-specification or the lowest sub-specification.

In another possible design, the third condition includes recognizing a second target object from the image. In this solution, if the second target object is recognized from the image, it may indicate that an object concerned by the first service currently appears, and the third image output specification may be kept as a current sub-specification for maintaining a high-specification image output, so as to perform first service processing. If the second target object is not recognized from the image, it may be considered that the object concerned by the first service does not appear currently, and the user may not want to trigger the first service. Therefore, the third image output specification may be switched to a lower or the lowest sub-specification, to reduce power consumption of the electronic device. For example, the second target object includes a preset gesture or a user gaze.

In another possible design, the sub-specification 4 is the same as the sub-specification 1, the sub-specification 5 is the same as the sub-specification 2, and the sub-specification 6 is the same as the sub-specification 3.

In another possible design, a parameter related to the image output specification includes one or more of parameters such as a frame rate, resolution, or a channel quantity of an image.

In other words, one or more of the parameters such as the frame rate, the resolution, or the channel quantity of the image are different for images of different image output specifications or different sub-specifications.

In another possible design, the first service includes air gesture detection.

In other words, the electronic device may perform air gesture detection based on an image of the first image output specification or an image of the third image output specification.

In another aspect, an embodiment of this application provides an electronic device, including a target camera and a first processing module. The first processing module runs an application of a first service and an application of a second service. The target camera is configured to: after being enabled, capture an image based on a first image output specification. The image captured based on the first image output specification is used to process the first service. The target camera is further configured to: after the second service starts, capture an image based on a second image output specification. The second image output specification is higher than the first image output specification. The image captured based on the second image output specification is used to process the second service. The second service includes photographing, video recording, or video calling, and the first service is different from the second service.

In a possible design, the target camera is further configured to: after the second service ends, capture an image based on the first image output specification.

In another possible design, the electronic device further includes a first image signal processor ISP. The target camera is further configured to: after the second service starts, send, to the first ISP, the image captured based on the second image output specification. The first ISP is configured to send the image captured based on the second image output specification to the first processing module, and process the image captured based on the second image output specification to obtain an image meeting a third image output specification. The image meeting the third image output specification is used to process the first service, and the second image output specification is higher than the third image output specification. After obtaining the image meeting the third image output specification, the first ISP may send the image to a second processing module. The first ISP and the second processing module may communicate with each other after security authentication, so as to exchange an image meeting the third image output specification.

In another possible design, the third image output specification is the same as the first image output specification.

In another possible design, the electronic device further includes a second processing module. The first image output specification includes a sub-specification 1 and a sub-specification 2, and the sub-specification 2 is higher than the sub-specification 1. That the target camera is configured to capture an image based on a first image output specification includes: capturing an image based on the sub-specification 1; sending the image captured based on the sub-specification 1 to the second processing module. If the second processing module determines, based on the image captured based on the sub-specification 1, that a first condition is met, the target camera captures an image based on the sub-specification 2.

In another possible design, the first image output specification further includes a sub-specification 3, and the sub-specification 3 is higher than the sub-specification 2. That the target camera is configured to capture an image based on a first image output specification further includes: sending the image captured based on the sub-specification 2 to the second processing module. If the second processing module determines, based on the image captured based on the sub-specification 2, that a second condition is met, the target camera captures an image based on the sub-specification 3. Alternatively, if the second processing module determines, based on the image captured based on the sub-specification 2, that the second condition is not met, the target camera captures the image based on the sub-specification 1.

In another possible design, that the target camera is configured to capture an image based on a first image output specification further includes: sending the image captured based on the sub-specification 3 to the second processing module. If the second processing module determines, based on the image captured based on the sub-specification 3, that a third condition is met, the target camera continues to capture the image based on the sub-specification 3. Alternatively, if the second processing module determines, based on the image captured based on the sub-specification 3, that the third condition is not met, the target camera captures the image based on the sub-specification 2 or the sub-specification 1.

In another possible design, the electronic device further includes a second processing module. The third image output specification includes a sub-specification 4 and a sub-specification 5, and the sub-specification 5 is higher than the sub-specification 4. That the first ISP is configured to process the image captured based on the second image output specification to obtain an image meeting a third image output specification includes: performing first processing on the image captured based on the second image output specification to obtain an image meeting the sub-specification 4; sending the image meeting the sub-specification 4 to the second processing module. If the second processing module determines, based on the image meeting the sub-specification 4, that a first condition is met, the first ISP performs second processing on an image subsequently captured based on the second image output specification to obtain an image meeting the sub-specification 5.

In another possible design, the third image output specification further includes a sub-specification 6, and the sub-specification 6 is higher than the sub-specification 5. That the first ISP is configured to process the image captured based on the second image output specification to obtain an image meeting a third image output specification further includes: sending the image meeting the sub-specification 5 to the second processing module. If the second processing module determines, based on the image meeting the sub-specification 5, that a second condition is met, the first ISP performs third processing on an image subsequently captured based on the second image output specification to obtain an image meeting the sub-specification 6. Alternatively, if the second processing module determines, based on the image meeting the sub-specification 5, that the second condition is not met, the first ISP performs first processing on an image subsequently captured based on the second image output specification to obtain an image meeting the sub-specification 4.

In another possible design, that the first ISP is configured to process the image captured based on the second image output specification to obtain an image meeting a third image output specification further includes: sending the image meeting the sub-specification 6 to the second processing module. If the second processing module determines, based on the image meeting the sub-specification 6, that a third condition is met, the first ISP continues to perform third processing on an image subsequently captured based on the second image output specification to obtain an image meeting the sub-specification 6. Alternatively, if the second processing module determines, based on the image meeting the sub-specification 6, that the third condition is not met, the first ISP performs second processing on an image subsequently captured based on the second image output specification to obtain the image meeting the sub-specification 5 or performs first processing on an image subsequently captured based on the second image output specification to obtain the image meeting the sub-specification 4.

In another possible design, the first condition includes: An image luminance change is greater than or equal to a preset threshold.

In another possible design, the second processing module includes a second ISP, and the second ISP is configured to determine whether it is met that the image luminance change is greater than or equal to the preset threshold.

In another possible design, the second condition includes recognizing a first target object from the image.

In another possible design, the first target object includes a face, a hand, a scenic spot, or an object.

In another possible design, the second processing module includes a processor, and the processor is configured to determine whether the first target object is recognized from the image.

In another possible design, the third condition includes recognizing a second target object from the image.

In another possible design, the second target object includes a preset gesture or a user gaze.

In another possible design, the processing module includes a processor, and the processor is configured to determine whether the second target object is recognized from the image.

In another possible design, a parameter related to the image output specification includes one or more of parameters such as a frame rate, resolution, or a channel quantity of an image.

In another possible design, the first service includes air gesture detection.

According to another aspect, an embodiment of this application provides a service processing apparatus. The apparatus is included in an electronic device. The apparatus has a function of implementing behavior of the electronic device in any method in the foregoing aspects and the possible designs, so that the electronic device performs the service processing method performed by the electronic device in any one of the possible designs of the foregoing aspects. The function may be implemented by hardware, or may be implemented by hardware executing corresponding software. The hardware or the software includes at least one module or unit corresponding to the foregoing function. For example, the apparatus may include a capturing unit, a processing unit, a determining unit, and the like.

According to still another aspect, an embodiment of this application provides an electronic device, including: one or more cameras, configured to capture an image; one or more processors; a memory, and one or more computer programs. The one or more computer programs are stored in the memory, the one or more computer programs include instructions, and when the instructions are executed by the electronic device, the electronic device is enabled to perform the service processing method performed by the electronic device in any possible design of the foregoing aspects.

According to still another aspect, an embodiment of this application provides an electronic device, including one or more processors and a memory. The memory stores code. When the code is executed by the electronic device, the electronic device is enabled to perform the service processing method performed by the electronic device in any possible design of the foregoing aspects.

According to another aspect, an embodiment of this application provides a computer-readable storage medium, including computer instructions. When the computer instructions are run on an electronic device, the electronic device is enabled to perform the service processing method according to any possible design of the foregoing aspects.

According to still another aspect, an embodiment of this application provides a computer program product. When the computer program product is run on a computer, the computer is enabled to perform the service processing method performed by the electronic device in any possible design of the foregoing aspects.

For beneficial effects corresponding to the other aspects, refer to descriptions of beneficial effects in the method aspects. Details are not described herein again.

DESCRIPTION OF EMBODIMENTS

Figure 1:
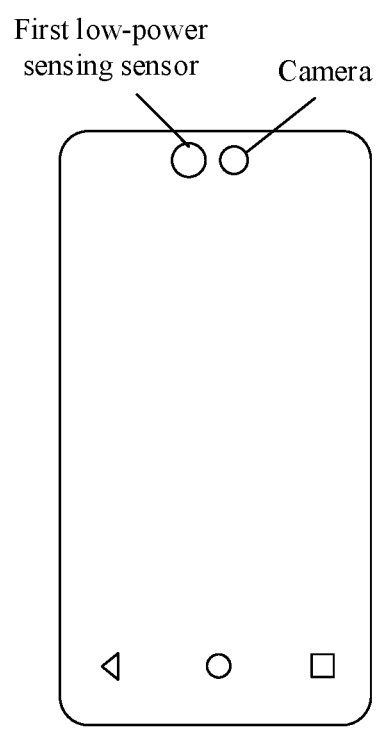
FIG. 1 is a schematic diagram of a location of a first low-power sensing sensor of an electronic device according to the conventional technology.

The following describes the technical solutions in embodiments of this application with reference to the accompanying drawings in embodiments of this application. In the descriptions of embodiments of this application, "/" represents "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

Descriptions such as "first", "second", . . . , and the like in this specification are merely used to distinguish an object or operation from another object or operation, and do not necessarily require or imply that any actual relationship or sequence exists between these objects or operations, and do not necessarily require or imply relative importance or implicitly indicate a quantity of indicated technical features. Therefore, a feature limited by "first" or "second" may explicitly or implicitly include one or more features. In the descriptions of embodiments, unless otherwise specified, "a plurality of" means two or more.

Embodiments of this application provide a service processing method and an electronic device, so that an existing camera of the electronic device can be multiplexed to implement a function of a first low-power sensing sensor, and no additional hardware of the first low-power sensing sensor is required. Therefore, costs of the electronic device and impact on product aesthetics and a screen-to-body ratio can be reduced, and design and manufacturing difficulties of the electronic device can be reduced.

The first low-power sensing sensor may be a sensor that works in low power consumption and can perform specific sensing on a surrounding condition of the electronic device. For example, the first low-power sensing sensor can sense a gesture, a face, or a posture of a user by using an image or a radar signal, or sense a current environment of the electronic device by using an image. For example, the first low-power sensing sensor may be a low-power camera, a radar sensor, or the like. In some embodiments, the first low-power sensing sensor may be a sensor disposed on the front of the electronic device, for example, a front-facing low-power camera.

For example, the electronic device may be a mobile terminal such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), or may be a device such as a camera. A specific type of the electronic device is not limited in embodiments of this application.

Figure 2:
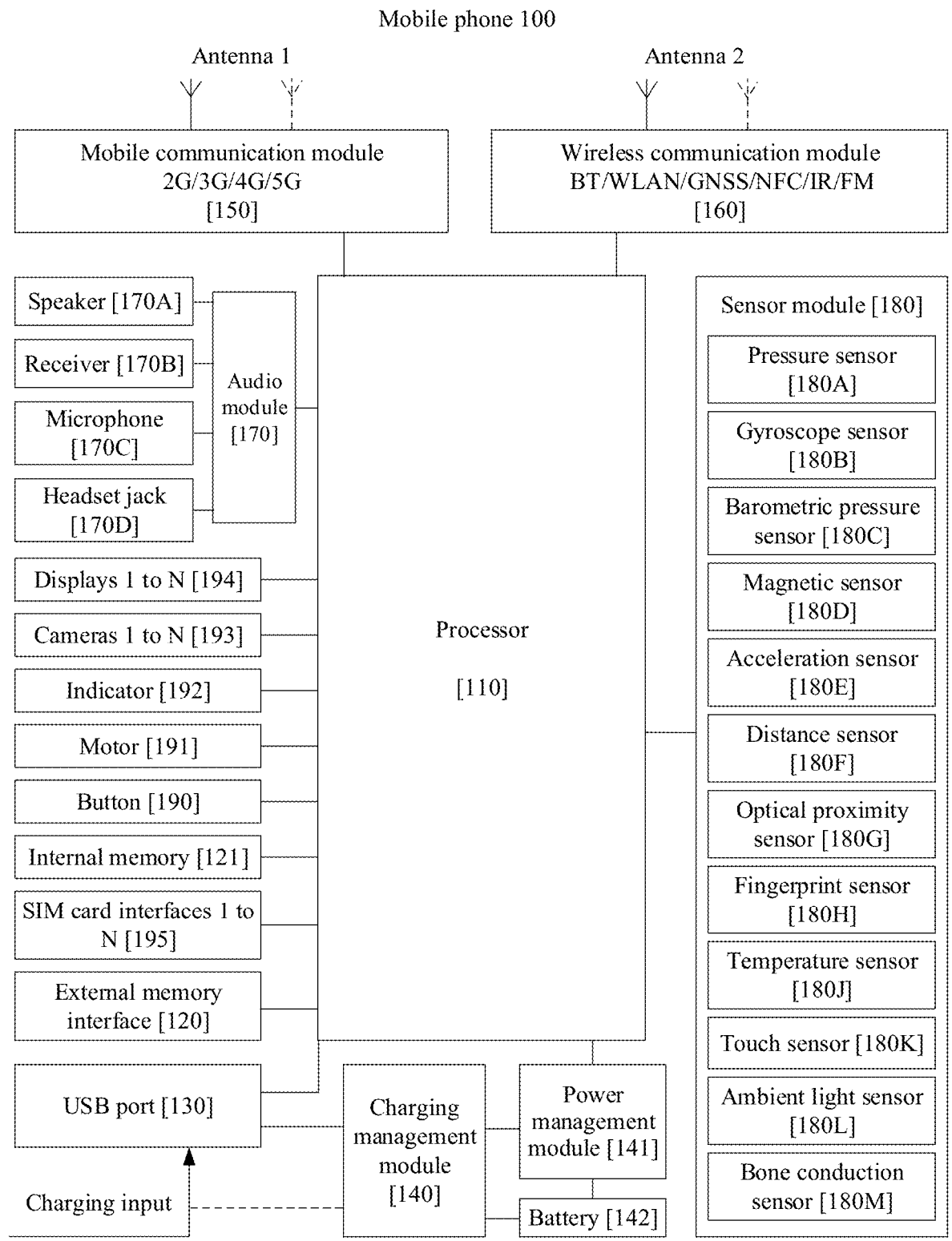
FIG. 2 is a schematic diagram of a structure of a mobile phone according to an embodiment of this application.

For example, the electronic device is a mobile phone. FIG. 2 is a schematic diagram of a structure of a mobile phone 100. The mobile phone 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces, for example, an inter-integrated circuit (inter-integrated circuit, I2C) interface. The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces.

The mobile phone 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transferred to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193. In embodiments of this application, the ISP may be coupled to the camera 193 through the I2C interface, so that the ISP communicates with the camera 193 through the I2C bus interface, to implement switching between a normal mode and a low power consumption mode of the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras 193, where N is a positive integer greater than 1.

The camera 193 may include a front-facing camera and/or a rear-facing camera. The front-facing camera and the rear-facing camera each may include one or more of the following cameras: a long-focus camera, a wide-angle camera, an ultra-wide-angle camera, a zoom camera, a depth camera, or the like. The long-focus camera has a small photographing range, and is applicable to photographing a distant scene. A photographing range of the wide-angle camera is large. The ultra-wide-angle camera has a photographing range larger than that of the wide-angle camera, and is applicable to photographing a scene with a large picture such as a panorama. The depth camera may be configured to measure an object distance of a photographed object, that is, measure depth information of the photographed object. For example, the depth camera may include a three-dimensional (3-dimensional, 3D) depth camera, a time of flight (time of flight, TOF) depth camera, a dual-lens depth camera, or the like.

Cameras included in the camera 193 may be classified into a primary camera and a secondary camera. The primary camera may be configured to photograph an image, for example, may include one or more of a long-focus camera, a wide-angle camera, an ultra-wide-angle camera, a zoom camera, or the like. The secondary camera may be used for ranging or other auxiliary functions, for example, may include a depth camera.

In embodiments of this application, one or more of the cameras 193 may be used as a target camera (the target camera described in embodiments of this application is merely a reference, or may have another name, for example, may be referred to as a first camera), to capture an image in a normal mode (for example, in a normal operating state) to process a camera service (for example, shooting or photographing), and capture an image in a low power consumption mode to process a low-power sensing service. A component such as a camera may separately operate in a low power consumption mode and a normal mode. When the component operates in the low power consumption mode, compared with operating in the normal mode, power consumption of the component is reduced, for example, a working frequency is reduced, and/or a data capturing specification is reduced. The electronic device enables some components to operate in the low power consumption mode to perform some low-power services, for example, detecting whether there is a gesture or a face in front of a screen. The target camera may be one or more cameras. In a possible implementation, there are a plurality of target cameras, and the target cameras are configured to cooperatively capture an image in the normal mode. When the target camera is configured to capture an image in the low power consumption mode, one of the target cameras may be used. Alternatively, the target camera may be one camera, for example, may be one of a plurality of cameras configured to capture an image in the normal mode, and the camera is further configured to capture an image in the low power consumption mode. In some embodiments, the target camera may be a front-facing camera. In some embodiments, in the normal mode, after being processed, an image captured by the target camera may be further used for processing a low-power sensing service at the same time. The low-power sensing service refers to a sensing service processed in a low power consumption state. For example, different responses are made by sensing different air gestures of the user in the low power consumption state (making a gesture in front of the screen), for example, sensing a gesture of waving to the left of the user to perform page down processing on screen content.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the mobile phone 100, such as image recognition, facial recognition, speech recognition, and text understanding.

The internal memory 121 may be configured to store computer-executable program code, and the executable program code includes instructions. The processor 110 runs the instructions stored in the internal memory 121, to perform various function applications of the mobile phone 100 and data processing. The internal memory 121 may include a program storage region and a data storage region. The program storage region may store an operating system, an application required by at least one function (for example, a sound playing function or an image playing function), and the like. The data storage region may store data (for example, audio data and an address book) created during use of the mobile phone 100, and the like. In addition, the internal memory 121 may include a high-speed random access memory, or may include a nonvolatile memory, for example, at least one magnetic disk storage device, a flash memory, or a universal flash storage (universal flash storage, UFS).

The processor 110 may run a first processing module, and run an application layer and a framework layer. The processor 110 may further run some other software modules, such as a native library (Native Library), an Android runtime (Android Runtime) layer, a hardware abstraction layer (hardware abstraction layer, HAL), or a kernel (kernel) layer. The application layer includes a series of application packages, for example, applications such as Camera, Gallery, Calendar, Phone, a social networking, a video call, Map, Navigation, WLAN, Bluetooth, Music, Videos, or Messaging.

In embodiments of this application, the mobile phone 100 may further include a security zone and a sensor control unit. The sensor control unit is configured to connect a plurality of types of sensors and process data output by the sensors. The security zone includes components such as a processor and a memory, and is configured to store and process private information or important information of the user. In addition, the security zone is isolated from another module, and it is difficult for the another module to obtain the private information or the important information of the user from the security zone. For example, the security zone may receive image data sent by the camera, perform processing such as luminance detection or image recognition, and then send image data after being processed by the sensor control unit to an upper-layer low-power sensing service.

It may be understood that the structure shown in this embodiment of this application does not constitute a specific limitation on the mobile phone 100. In some other embodiments of this application, the mobile phone 100 may include more or fewer components than components shown in the figure, or some components may be combined, or some components may be split, or there may be a different component arrangement. The components shown in the figure may be implemented by hardware, software, or a combination of software and hardware.

The following describes a service processing method by using an example in which the electronic device is a mobile phone.

Figure 3:
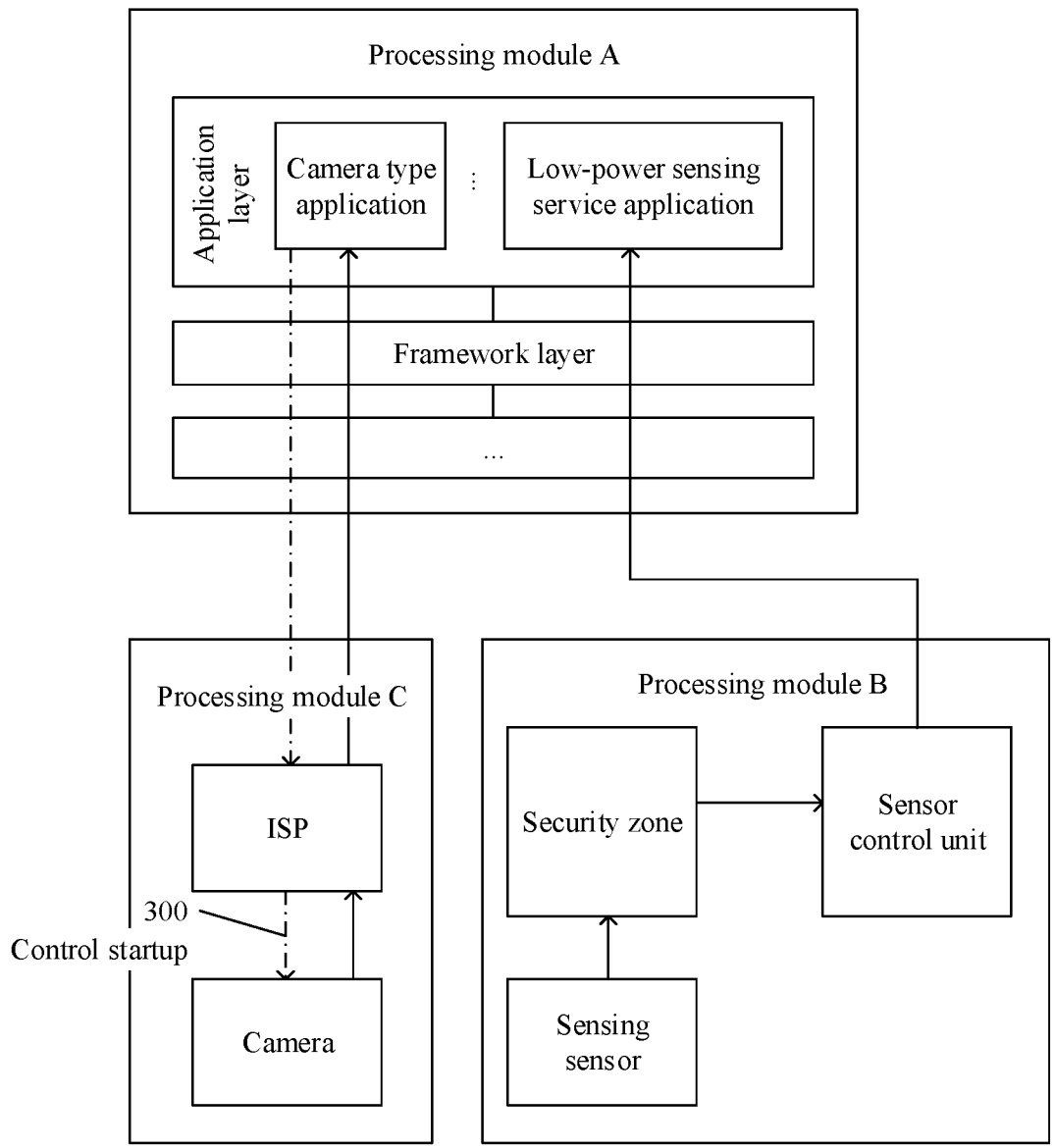
FIG. 3 is an architectural diagram of a low-power service sensing system according to an embodiment of this application.

In an existing low-power sensing solution, a mobile phone implements a low-power service sensing function by adding a first low-power sensing sensor. For example, in this solution, for an architectural diagram of a low-power service sensing system of the mobile phone, refer to FIG. 3. As shown in FIG. 3, the mobile phone includes a processing module A and a processing module B. The processing module A runs software modules such as an application layer and a framework layer. The application layer includes a plurality of applications, for example, a camera type application or a low-power sensing service application. In embodiments of this application, an application may also be referred to as an application for short. The camera type application may include an application that needs to use a camera to capture an image, such as a camera application or a video call application. The processing module B includes a first low-power sensing sensor, a security zone, and a sensor control unit. The mobile phone executes a low-power sensing service (for example, turns on a screen) by using the processing module B. The first low-power sensing sensor in the processing module B sends captured image data of a grayscale image to the security zone for processing such as image recognition. The security zone sends a processing result to the sensor control unit. The sensor control unit performs post-processing and sends a result to a low-power sensing service application in the processing module A, so as to execute a corresponding low-power sensing service.

In addition, in the solution shown in FIG. 3, the mobile phone further includes a processing module C. The processing module C includes a camera, an ISP, and a control channel 300 between the ISP and the camera. The ISP controls the camera to be enabled by using the control channel 300. The mobile phone executes, by using the processing module C, a camera type service corresponding to a camera type application, for example, a service that needs to use the camera to capture an image, such as photographing, video recording, or video call. When the mobile phone enables the camera type service, the camera sends captured image data of a color image to the ISP for processing, and the ISP sends processed data to the camera type application in the processing module A, so as to execute a corresponding camera type service.

In a solution provided in the following embodiments of this application, by adding a low-power channel (which may be understood as a new signal channel, for example, two objects that originally do not communicate with each other can now communicate with each other), an existing target camera of the mobile phone may be multiplexed to implement a function of the first low-power sensing sensor, without adding a piece of hardware of the first low-power sensing sensor, thereby reducing costs of the mobile phone and impact on product aesthetics and a screen-to-body ratio, and reducing design and manufacturing difficulties of the mobile phone.

The following describes the service processing method provided in embodiments of this application from a perspective of a combination of software and hardware.

Figure 4A:
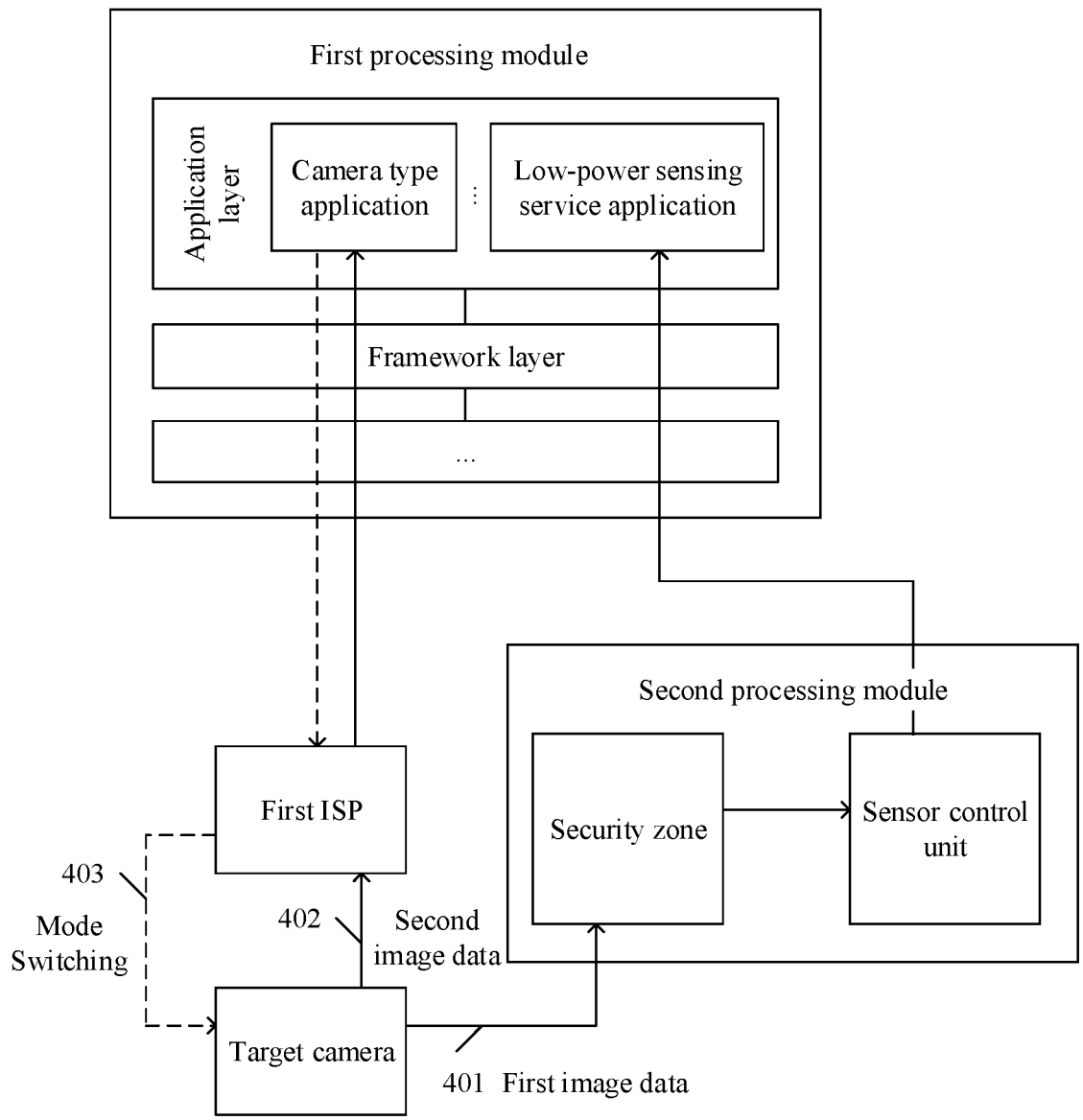
FIG. 4A is an architectural diagram of a low-power service sensing system according to an embodiment of this application.

For example, for an architectural diagram of a low-power service sensing system according to an embodiment of this application, refer to FIG. 4A. As shown in FIG. 4A, the mobile phone includes a first processing module, a first ISP, a second processing module, and a target camera. The target camera may be configured to perform a camera service, or may be multiplexed to perform a low-power sensing service.

Figure 4B:
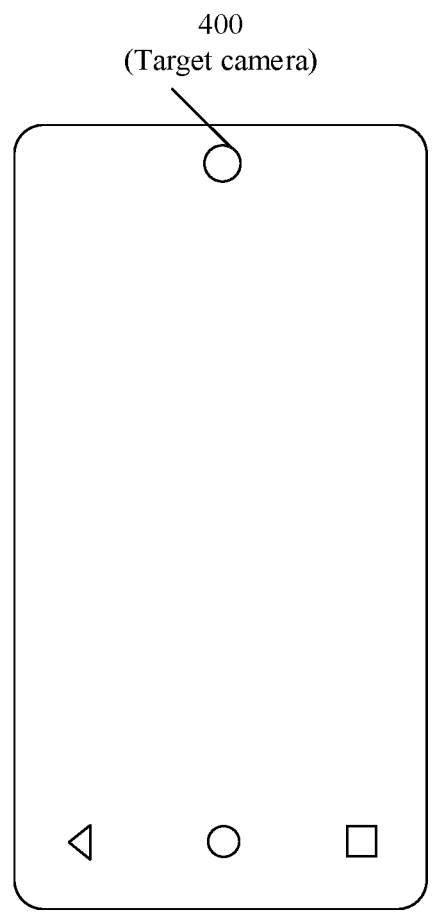
FIG. 4B is a schematic diagram of a location of a target camera of an electronic device according to an embodiment of this application.

The multiplexed target camera is an existing camera of the mobile phone, and may be specifically one or more cameras. In addition, the multiplexed target camera may be a front-facing camera and/or a rear-facing camera, and may be configured to implement a sensing function such as gesture recognition, facial recognition, user posture recognition, or environment recognition. For example, when the target camera is the front-facing camera, the target camera may be configured to implement a sensing function such as gesture recognition, facial recognition, or user posture recognition. When the target camera is the rear-facing camera, the target camera may be configured to implement a sensing function such as environment recognition. For example, refer FIG. 4B. A multiplexed target camera 400 is a front-facing primary camera. In addition, the multiplexed target camera may be further switched to another existing camera of the mobile phone. For example, an upper-layer service layer or the security zone may deliver an instruction in a specific scenario or when a preset condition is met, to instruct the multiplexed target camera to switch to another camera of the mobile phone.

In the architectural diagram of the low-power service sensing system shown in FIG. 4A, the first processing module is similar to the processing module A shown in FIG. 3, and may also be different from the processing module A shown in FIG. 3 (for example, the first processing module may be different from the processing module A in controlling the ISP. Specifically, for example, a control signal that may be sent to the ISP is different from that in FIG. 3, and an operation performed by the ISP controlled by the signal is different from that performed by the ISP in FIG. 3). Similar to the processing module A shown in FIG. 3, the first processing module also runs a plurality of software modules, and the first processing module may run different software modules in different operating systems. For example, in an Android system, the first processing module runs an application layer and a framework layer, and further runs software modules such as a native library (Native Library) layer, an Android runtime (Android Runtime), a hardware abstraction layer (hardware abstraction layer, HAL), and a kernel (kernel) layer. The application layer includes a plurality of applications, for example, a camera type application (including a camera application or a video call application) and a low-power sensing service application. The first processing module may be implemented by using the processor 110 shown in FIG. 2 or a processing core (for example, a big core) in the processor 110. The second processing module is similar to the processing module B shown in FIG. 3 and is also different from the processing module B shown in FIG. 3. Similar to the processing module B shown in FIG. 3, the second processing module includes components such as a security zone and a sensor control unit. The security zone may store or process private information or important information of the user, and the security zone is isolated from another module of the mobile phone. It is difficult for the another module of the mobile phone to obtain the private information or the important information of the user from the security zone. In embodiments of this application, the security zone may perform processing such as image recognition on data output by the target camera. The sensor control unit is configured to connect a plurality of types of sensors (such as a camera) and process data output by the sensors. In embodiments of this application, the sensor control unit may further process an image processing result output by the security zone, and send the obtained processing result to the low-power sensing service application for service processing. The first processing module, the second processing module, and the sensor control unit may be modules combining software and hardware, and may be specifically implemented by using different processing chips, or may be integrated into a same processing chip. This is not limited in embodiments of this application.

In embodiments of this application, the target camera of the mobile phone may be always on after the mobile phone is powered on, or may be enabled after a preset condition is met (for example, after a screen of the mobile phone is turned on), or may be intermittently enabled when the mobile phone does not enable the target camera to process a camera type service. After the target camera is enabled, the target camera is in a low power consumption mode by default. Different from the processing module B shown in FIG. 3, a first data transmission channel 401 is located between the security zone and the target camera in the second processing module shown in FIG. 4A, and is used to send, in the low power consumption mode, first image data obtained by the target camera by capturing a first image to the security zone. In addition, as shown in FIG. 4A, a second data transmission channel 402 is located between the target camera and the first ISP, and is used to send, to the first ISP in a normal mode, second image data obtained by the target camera by capturing a second image. A first control channel (for example, an I2C control channel) 403 is located between the first ISP and the target camera, and is used to control the target camera to switch between the low power consumption mode and the normal mode (the first control channel 403 may be further used to control the target camera to be enabled), which is different from the control channel 300 in the conventional technology shown in FIG. 3 being only used to control the camera to be enabled. The second image data sent to the first ISP through the second data transmission channel may be data of an image with a high image output specification and high quality, for example, data of a color image with high resolution. The first image data sent to the security zone through the first data transmission channel may be data of an image with a low image output specification, for example, data of a grayscale image with low resolution. A parameter related to the image output specification includes a frame rate and/or quality of an image, and the quality of the image includes resolution (or referred to as a size) and/or a quantity of channels of the image. The quantity of channels of the image is used to indicate that the image is a color image or a grayscale image. An RGB color image consists of three channels: red (Red), green (Green), and blue (Blue). Color images in other formats can be converted to RGB color images, and are represented by the three channels. A grayscale image has only one grayscale value and one channel.

Figure 5A:
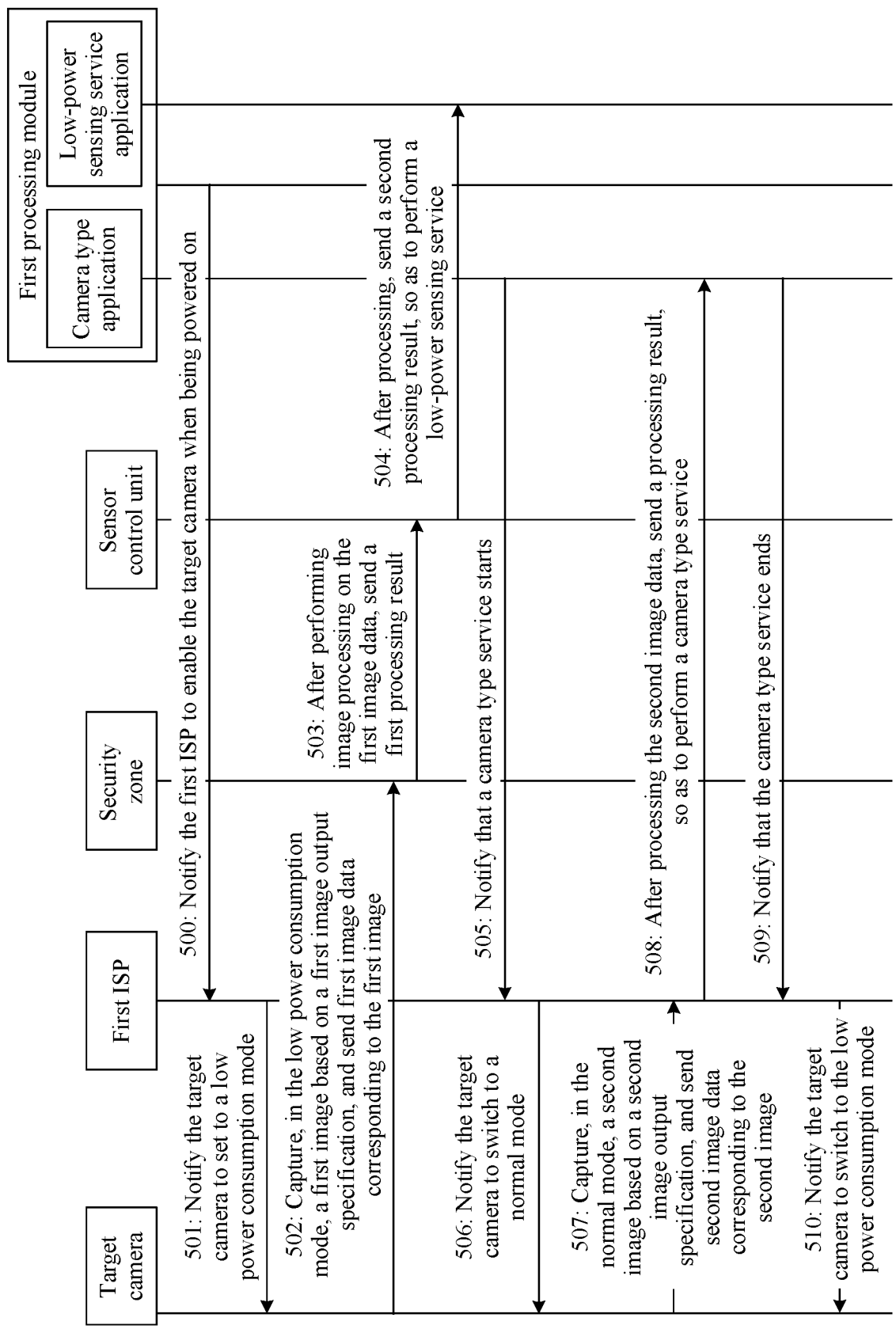
FIG. 5A is a flowchart of a service processing method according to an embodiment of this application.
Figure 5B:
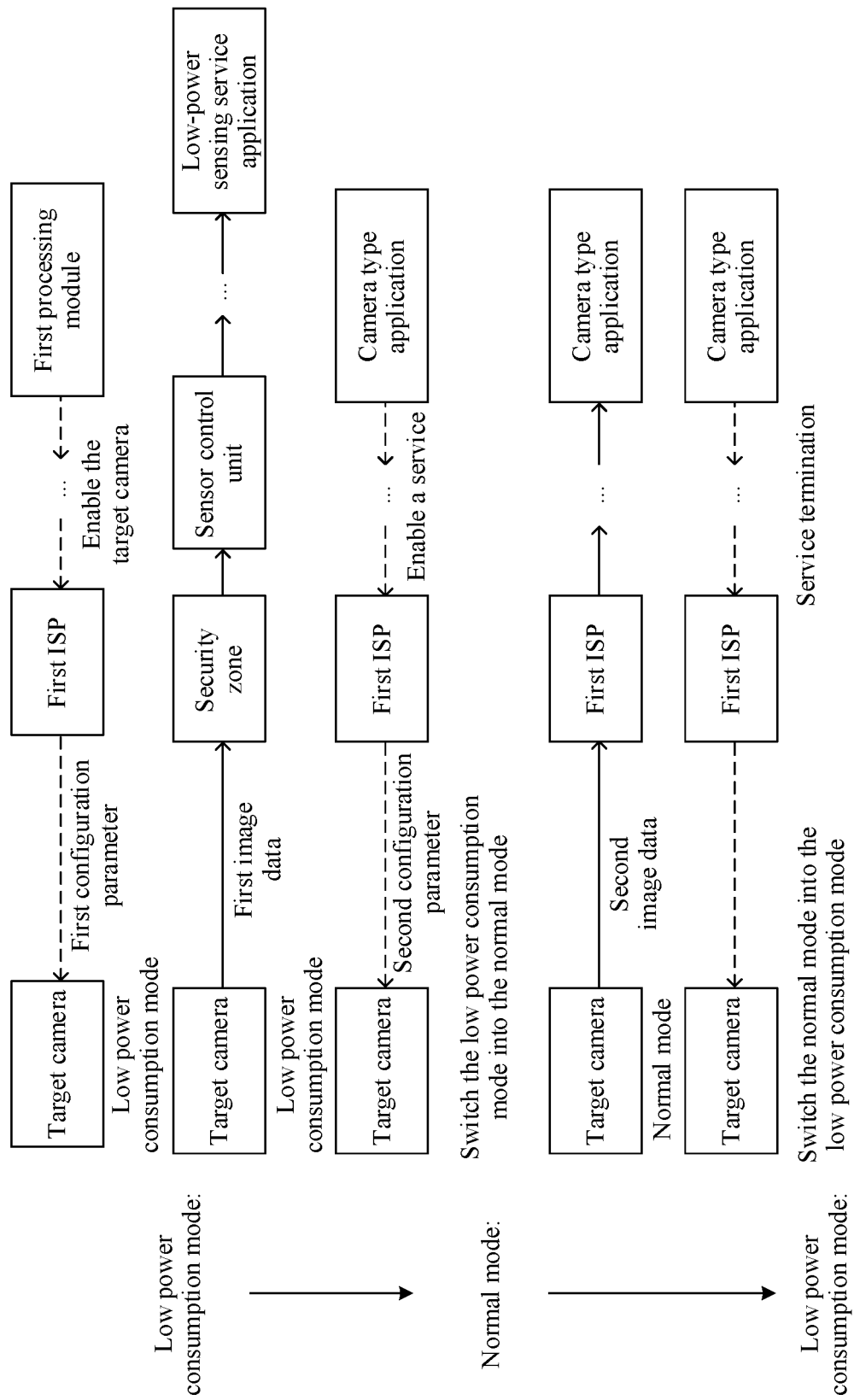
FIG. 5B is a schematic diagram of mode switching of a target camera according to an embodiment of this application.

Based on the system architecture shown in FIG. 4A, an embodiment of this application provides a service processing method. Refer to FIG. 5A and FIG. 5B. The method includes the following steps:

500: When the mobile phone is powered on, the first processing module indicates the first ISP to enable the target camera.

When the mobile phone is powered on and initialized, the mobile phone may enable the target camera to perform a low-power service sensing function by using the target camera. The first processing module may notify the first ISP to enable the target camera when the mobile phone is powered on.

501: The first ISP notifies the target camera to set to the low power consumption mode.

In some embodiments, the first ISP sends a first configuration parameter to the target camera, and the first configuration parameter corresponds to the low power consumption mode. The first ISP sends the first configuration parameter to the target camera, that is, notifies the target camera to set to the low power consumption mode.

The first configuration parameter is used to indicate a parameter required when the target camera captures an image in the low power consumption mode. For example, the first configuration parameter may include a capturing frame rate of an image, resolution of the image, a chroma type, an exposure parameter, or the like. In addition, the first configuration parameter may further include a first destination address, and the first destination address is an address of the security zone. The first destination address is used to indicate the target camera to send, to the security zone, the first image data obtained by capturing the first image.

In some other embodiments, the first configuration parameter further includes a first mode identifier, and the first mode identifier is used to indicate to set the target camera to the low power consumption mode.

It may be understood that different types of data in the first configuration parameter may be sent by the first ISP to the target camera in one or more instructions.

In some other embodiments, the target camera stores the first configuration parameter corresponding to the low power consumption mode, and the first ISP does not send the first configuration parameter to the target camera, but sends only the first mode identifier corresponding to the low power consumption mode.

It should be noted that, in some other embodiments, the mobile phone may not perform step 500 and step 501. After the mobile phone is powered on, the target camera is in the low power consumption mode by default, and captures the first image by using the preconfigured first configuration parameter by default based on the first image output specification.

Alternatively, when the mobile phone is powered on for the first time, the mobile phone may perform step 500 and step 501, and configure the first configuration parameter in the target camera. Subsequently, after the mobile phone is powered on again, the target camera is in the low power consumption mode by default, and captures the first image by using the preconfigured first configuration parameter by default based on the first image output specification.

It should be further noted that the first image in embodiments of this application may be a series of images captured by the target camera in the low power consumption mode based on the first image output specification, and is not merely a frame of image. At different moments in the low power consumption mode, first images captured by the target camera are different.

502: The target camera captures the first image in the low power consumption mode based on the first image output specification, and sends the first image data corresponding to the first image to the security zone.

After receiving the first configuration parameter, the target camera captures the image based on the first configuration parameter, to obtain the first image data. The first configuration parameter corresponds to the first image output specification, and the target camera captures an image based on the first configuration parameter, that is, the target camera captures an image based on the first image output specification. When the target camera captures the image based on the first configuration parameter, the target camera is in the low power consumption mode corresponding to the first configuration parameter. Alternatively, after receiving the first mode identifier, the target camera may determine that the target camera is currently in the low power consumption mode, and capture the image based on the first configuration parameter, to obtain the first image data. In other words, after the target camera is enabled, the target camera is in the low power consumption mode by default.

In the low power consumption mode, the target camera sends, through the first data transmission channel, the first image data to a security zone corresponding to the first target address. Because a processing capability of the security zone is limited, the first image data may be data of an image with poor quality, for example, data of a grayscale image with a low frame rate and low resolution.

503: After performing image processing on the first image data, the security zone sends a first processing result to the sensor control unit.

A plurality of image processing algorithms, for example, a luminance detection algorithm or an image recognition algorithm, run in the security zone. For example, the image recognition algorithm includes algorithms such as gesture recognition, facial recognition, user posture recognition, or environment recognition. After performing image processing on the first image data, the security zone may send the first processing result to the sensor control unit.

504: After processing the first processing result of one or more pieces of the first image data, the sensor control unit sends an obtained second processing result to the low-power sensing service application in the first processing module, so as to perform a corresponding low-power sensing service.

The sensor control unit may perform algorithm post-processing on the one or more pieces of the first image data based on the first processing result obtained by using one or more image processing algorithms, to send the obtained second processing result to the low-power sensing service application, so as to perform the corresponding low-power sensing service.

For example, the low-power sensing service may include an air gesture (for example, waving to the left, waving to the right, or clenching a fist) response, screen auto-rotation, screen-on, or the like. For example, in a screen-on state, if the mobile phone detects an air gesture of waving to the left, the mobile phone performs a low-power sensing service of flipping down a page. For another example, when the user is lying on a side to watch a video of the mobile phone, the mobile phone may set the screen status to a portrait mode based on data of a gravity sensor, but the mobile phone automatically rotates the screen to a landscape mode based on a user image and an environment image that are captured when the user is lying on the side, so as to match a side lying state of the user.

The sensor control unit may send the second processing result to the low-power sensing service application in the first processing module each time. Alternatively, the sensor control unit may periodically send the second processing result to the low-power sensing service application in the first processing module based on a preset period. Alternatively, when determining that a current second processing result is different from a previous second processing result, the sensor control unit may report the current second processing result to the low-power sensing service application in the first processing module. Alternatively, the sensor control unit sends the second processing result to the low-power sensing service application only after a low-power sensing service trigger condition is met. For example, the second processing result is that a hand is detected, and the sensor control unit does not report the second processing result. The second processing result is that the waving to the left is detected, the low-power sensing service trigger condition of the air gesture is met, and therefore the second processing result is reported to the low-power sensing service application. For different low-power sensing service applications or second processing results, a reporting manner of the sensor control unit may be different.

505: When the mobile phone has the camera type service, the camera type application in the first processing module notifies the first ISP that the camera type service starts.

For example, when the user wants to take a photo, record a video, or make a video call, the camera type service starts, and the camera type application may notify the first ISP that the camera type service starts.

506: The first ISP notifies the target camera to switch to the normal mode.

In some embodiments, the first ISP sends a second configuration parameter to the target camera. The second configuration parameter corresponds to the normal mode. The first ISP sends the second configuration parameter to the target camera, that is, notifies the target camera to set to the normal mode.

The second configuration parameter is used to indicate a parameter required when the target camera captures an image in the normal mode. For example, the second configuration parameter may include a capturing frame rate of an image, resolution of the image, a chroma type, an exposure parameter, or the like. In addition, the second configuration parameter further includes a second destination address, and the second destination address is an address of the first ISP. The second destination address is used to indicate the target camera to send, to the first ISP, the second image data obtained by capturing the second image.

In some other embodiments, the second configuration parameter further includes a second mode identifier, and the second mode identifier is used to indicate to set the target camera to the normal mode.

It may be understood that different types of data in the second configuration parameter may be sent by the first ISP to the target camera in one or more instructions.

In some other embodiments, the target camera stores the second configuration parameter corresponding to the normal mode, and the first ISP does not send the second configuration parameter to the target camera, but sends only the second mode identifier corresponding to the normal mode.

507: The target camera captures the second image in the normal mode based on a second image output specification, and sends the second image data corresponding to the second image to the first ISP.

After receiving the second configuration parameter, the target camera captures the image based on the second configuration parameter, to obtain the second image data. The second configuration parameter corresponds to the second image output specification, and the target camera captures an image based on the second configuration parameter, that is, the target camera captures an image based on the second image output specification. When the target camera captures the image based on the second configuration parameter, the target camera is in the normal mode corresponding to the second configuration parameter. Alternatively, after receiving the second mode identifier, the target camera may determine that the target camera is currently in the normal mode, and capture the image based on the second configuration parameter, to obtain the second image data. In other words, the target camera switches from the low power consumption mode to the normal mode.

In the normal mode, the target camera sends, through the second data transmission channel, the second image data obtained by capturing the second image based on the second configuration parameter to the first ISP corresponding to the second destination address. The second image data may be data of an image with high quality, for example, data of a color image with a high frame rate and high resolution. In other words, the second image output specification is higher than the first image output specification.

It should be noted that, the second image in embodiments of this application is a series of images captured by the target camera in the normal mode based on the second image output specification, and is not merely a frame of image. At different moments in the normal mode, second images captured by the target camera are different.

508: After processing the second image data, the first ISP sends a processing result to the camera type application in the first processing module, so as to perform the camera type service.

For example, the camera type application may perform the camera type service such as photographing, video recording, or video call.

In other words, the mobile phone captures an image in the low power consumption mode by default based on the first image output specification with low power consumption, and switches to the normal mode to capture an image based on the second image output specification with high power consumption only when there is a camera type service. Therefore, power consumption of the mobile phone can be reduced as much as possible, and power of the mobile phone can be saved.

509: When the camera type service ends, the camera type application notifies the first ISP that the camera type service stops.

For example, after the user ends the video call, the camera type service ends, and the video call application may notify the first ISP that the video call service ends.

510: The first ISP notifies the target camera to switch to the low power consumption mode, and then cyclically performs the foregoing step 502 to step 510.

In some embodiments, the first ISP may send the first configuration parameter corresponding to the low power consumption mode to the target camera, to indicate the target camera to capture the first image in the low power consumption mode based on the first configuration parameter.

In some other embodiments, the target camera previously stores the first configuration parameter sent by the first ISP, and the configuration parameter sent by the first ISP to the target camera is empty, to indicate the target camera to capture the first image by using the default first configuration parameter in the low power consumption mode.

In some other embodiments, the target camera previously stores the first configuration parameter sent by the first ISP, and the first ISP sends only the first mode identifier to the target camera, and does not send the first configuration parameter any more, to indicate the target camera to capture the first image in the low power consumption mode by using the first configuration parameter.

In other words, after the camera type service ends, the target camera may continue to return to the low power consumption mode to capture an image based on the first image output specification with low power consumption, so as to reduce power consumption of the mobile phone as much as possible and save power of the mobile phone.

In the solution described in the foregoing step 500 to step 510, the first ISP may run corresponding control code to control the target camera to switch between the normal mode and the low power consumption mode.

Compared with the solution shown in FIG. 3, in the architectural diagram of the low-power service sensing system shown in FIG. 4A, the first low-power sensing sensor is not added to the mobile phone, but the first data transmission channel (which is a part of the low-power channel) is added between the existing target camera of the mobile phone and the security zone, to multiplex the existing target camera to implement a function of the first low-power sensing sensor. In this way, a same target camera may have two modes, namely, a normal mode and a low power consumption mode. When the user uses the target camera to process a camera type service, the target camera switches to the normal mode to perform normal photographing, video recording, video call, or the like. When the user does not use the target camera to process the camera type service, the target camera switches to the low power consumption mode for use of the low-power sensing service.

In the solution described in the foregoing step 500 to step 510, the existing target camera of the mobile phone may be multiplexed to implement both the camera type service and the low-power sensing service, and no additional hardware of the first low-power sensing sensor is required, thereby reducing costs and impact on product aesthetics and a screen-to-body ratio, and reducing design and manufacturing difficulties of the mobile phone.

In addition, by default, the mobile phone captures an image based on the first image output specification with low power consumption, and captures an image based on the second image output specification with high power consumption only when there is a camera type service. Therefore, power consumption of the mobile phone can be reduced as much as possible, and power of the mobile phone can be saved.

In addition, to implement the foregoing service processing functions, the mobile phone includes corresponding hardware and/or software modules for performing the functions. In a module division manner provided in this embodiment of this application, refer to FIG. 5C. The security zone may include a second ISP, a processor, and a memory. The security zone may be a system combining software and hardware. The processor and the second ISP may be processors running software. The sensor control unit may be a chip running software. The second ISP may be a lightweight mini-ISP. The processor may be a low-power processor such as a tiny chip, and may be configured to run an image recognition algorithm such as gesture recognition, facial recognition, user posture recognition, environment recognition, or the like. The memory is configured to store data such as a program, image data, an image recognition result, or the like. The second ISP may be always on, and the processor in the security zone may not be always on, but is enabled only when the image recognition algorithm needs to be run.

Figure 5C:
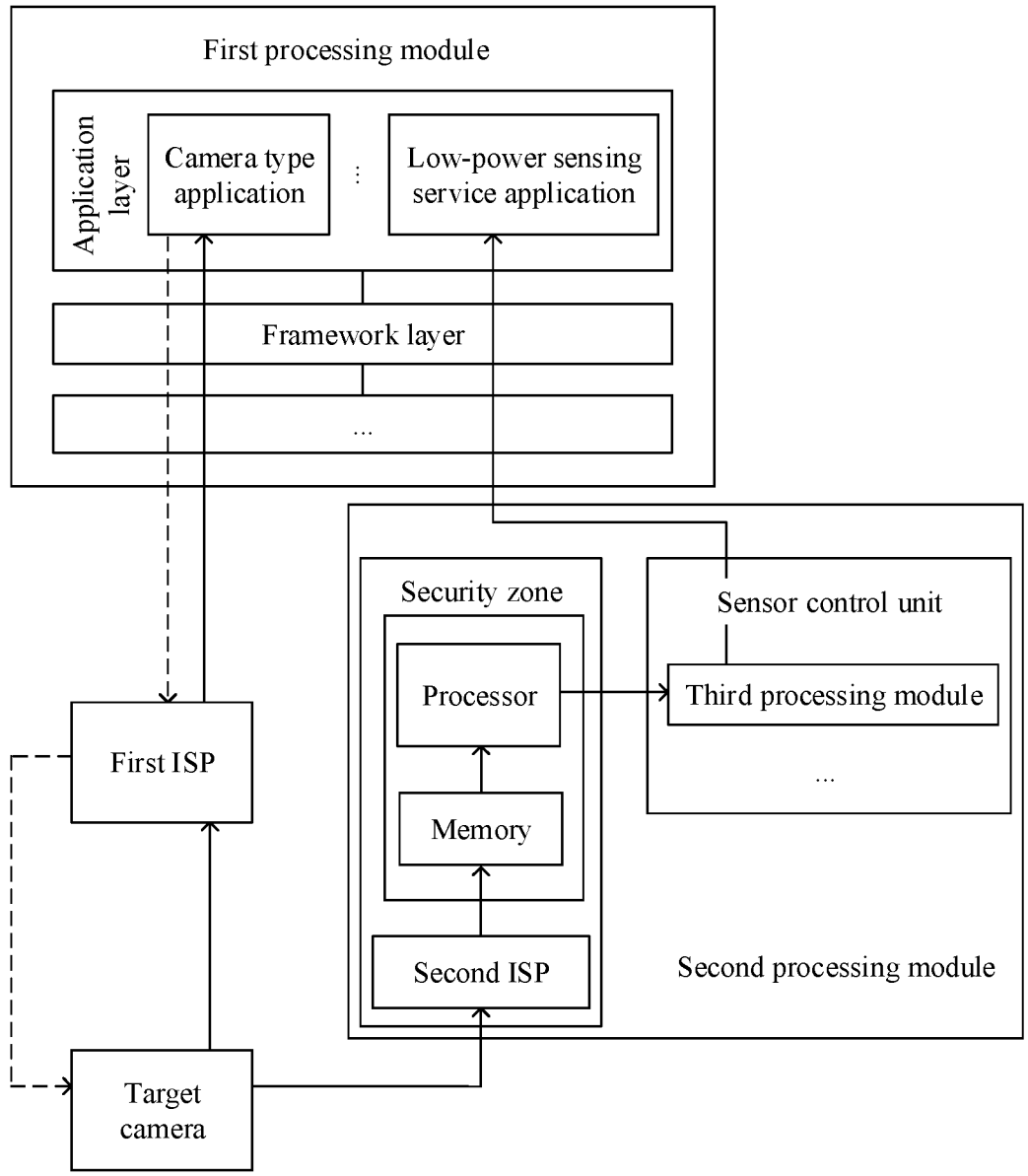
FIG. 5C is an architectural diagram of another low-power service sensing system according to an embodiment of this application.

As shown in FIG. 5C, the sensor control unit (for example, which may be a sensor hub) includes a third processing module, and the third processing module is configured to perform further processing on an image processing result from the security zone, for example, perform fusion processing on a plurality of processing results from the security zone to obtain another processing result. The third processing module may also be referred to as an algorithm post-processing module. In addition, the sensor control unit may further include a management module, a sensor driver module, and the like. The management module is configured to manage the processor, for example, is responsible for control such as loading and power-on of the processor. The sensor driver module is configured to drive a sensor (for example, a camera) connected to the sensor control unit.

Based on the module shown in FIG. 5C, in step 502 in the foregoing embodiment, the target camera may send the first image data to the second ISP in the security zone. In the foregoing step 503, after the second ISP in the security zone performs image processing on the first image data, or the second ISP stores the first image data in the memory, so that the processor sends the first processing result to the third processing module in the sensor control unit after performing image processing on the first image data. In the foregoing step 504, after processing the first processing result of one or more pieces of the first image data, the third processing module sends the obtained second processing result to the low-power sensing service application in the first processing module.

Figure 6A:
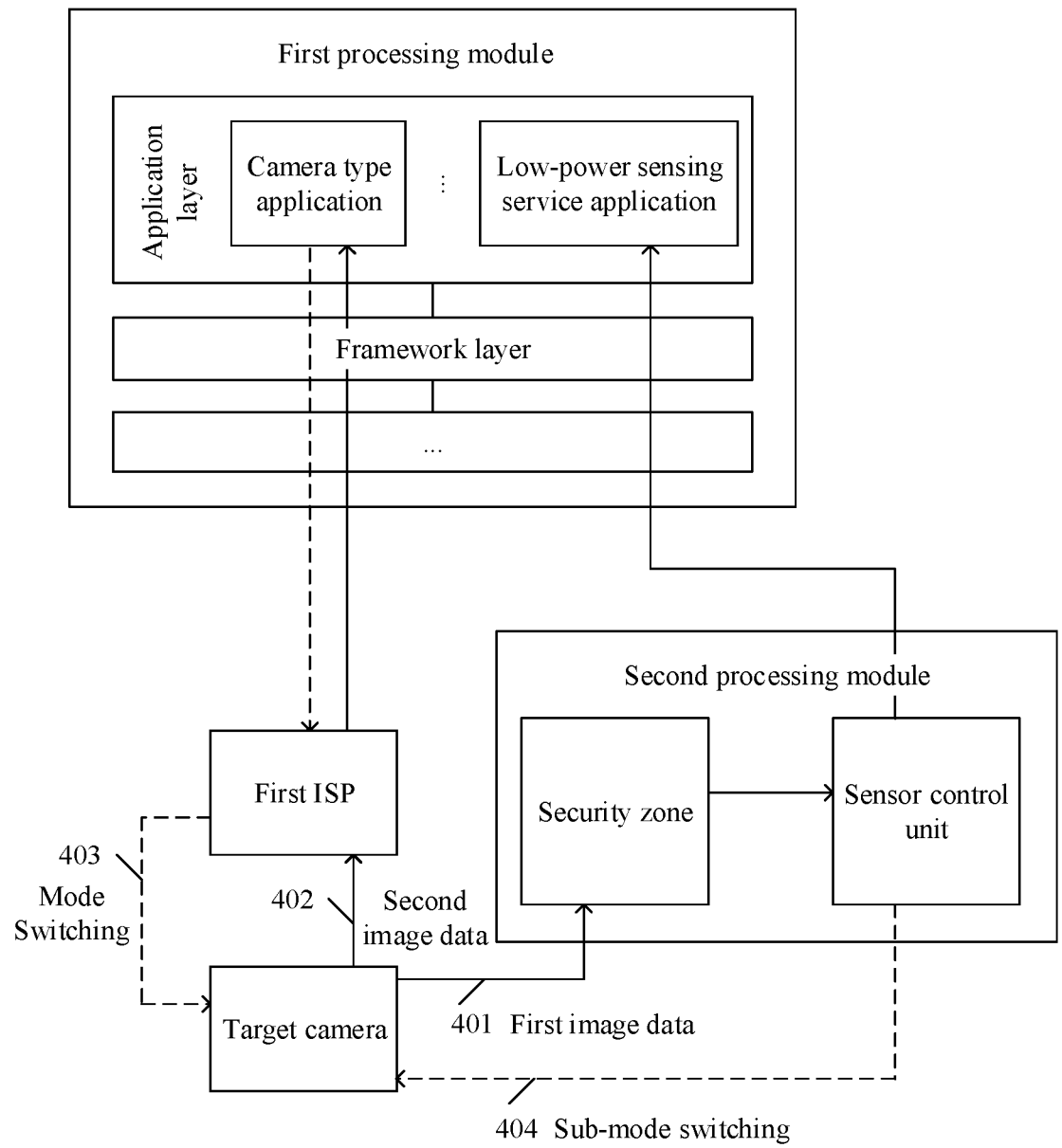
FIG. 6A is an architectural diagram of another low-power service sensing system according to an embodiment of this application.

In some embodiments of this application, the low power consumption mode may include a plurality of sub-modes, and different sub-modes correspond to different power consumption of the mobile phone. The different sub-modes may be switched based on a scenario requirement, so that power consumption of the mobile phone matches a current scenario requirement, unnecessary power consumption is reduced, and power of the mobile phone is saved as much as possible. Refer to FIG. 6A. There is a second control channel (for example, an I2C control channel) 404 between the sensor control unit and the target camera. The second control channel also belongs to a part of the low-power channel, and is configured to control the target camera to switch between the different sub-modes of the low power consumption mode. The security zone controls the target camera by running corresponding control code, and switches between the different sub-modes of the low power consumption mode.

In the low power consumption mode, the mobile phone may reduce power consumption by reducing an image output specification of the target camera. As described above, a parameter related to the image output specification includes a frame rate and/or quality of an image, and the quality of the image includes resolution and/or a quantity of channels of the image. For example, the mobile phone may modify the image output specification by modifying an image output configuration register corresponding to the target camera. For example, the image output configuration register may be a physical (PHY) register specified in the Mobile Industry Processor Interface (Mobile Industry Processor Interface, MIPI) protocol.

Figure 6B:
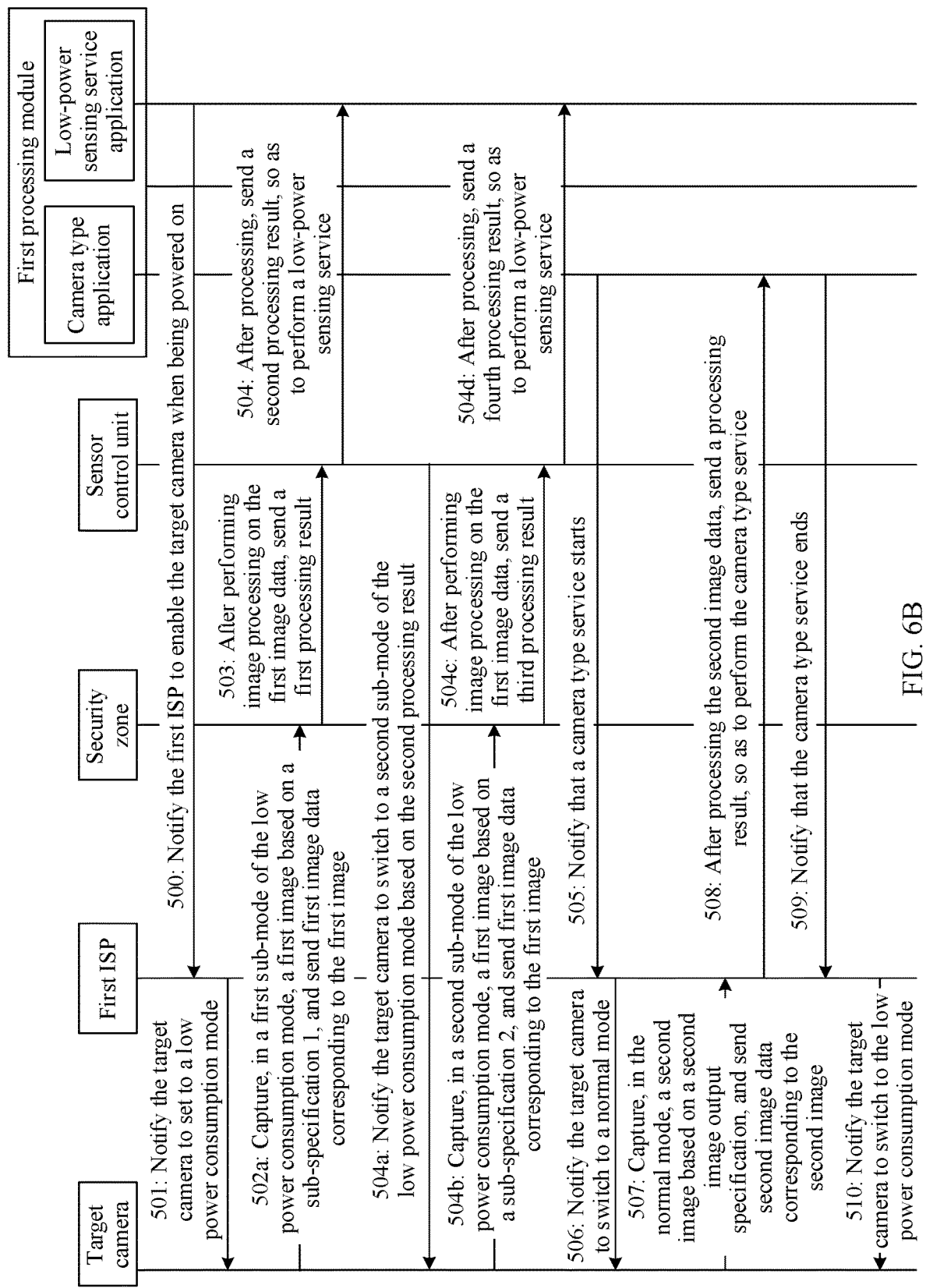
FIG. 6B is a flowchart of another service processing method according to an embodiment of this application.

In a case in which the low power consumption mode includes a plurality of sub-modes, the first configuration parameter also includes sub-configuration parameters corresponding to the sub-modes, and different sub-configuration parameters correspond to different sub-specifications in the first image output specification. Refer to FIG. 6B. The foregoing step 502 specifically includes the following steps.

502a: The target camera captures, in a first sub-mode of the low power consumption mode, the first image based on a corresponding first sub-configuration parameter based on the sub-specification 1, and sends the first image data corresponding to the first image to the security zone.

Then, after the foregoing step 504 and before the foregoing step 505, the method further includes:

504a: The sensor control unit notifies, based on the second processing result, the target camera to switch to a second sub-mode of the low power consumption mode.

504b: The target camera captures, in the second sub-mode of the low power consumption mode, the first image based on a corresponding second sub-configuration parameter based on the sub-specification 2, and sends the first image data corresponding to the first image to the security zone.

504c: After performing image processing on the first image data, the security zone sends a third processing result to the sensor control unit.

504d: After processing the third processing result of one or more pieces of the first image data, the sensor control unit sends an obtained fourth processing result to the low-power sensing service application in the first processing module, so as to perform a corresponding low-power sensing service.

It may be understood that, the first image herein refers to a series of images captured by the target camera in the low power consumption mode based on different sub-specifications in the first image output specification, and is not only a frame of image. At different moments in the low power consumption mode, first images captured by the target camera are different.

Figure 6C:
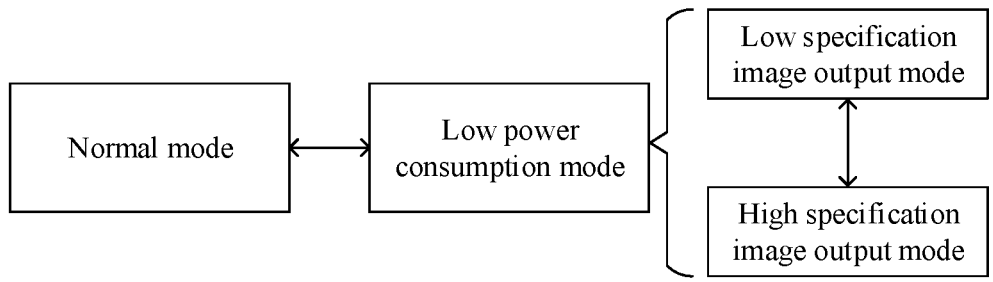
FIG. 6C is a schematic diagram of mode classification of a target camera according to an embodiment of this application.

In some embodiments, refer to FIG. 6C. The target camera includes a normal mode and a low power consumption mode. The low power consumption mode may include two sub-modes: a low-specification image output mode and a high-specification image output mode.

For example, in the low-specification image output mode, an image output specification of the target camera is an image resolution 320*240 and is a grayscale image, and an image output frame rate is 2 fps. Compared with the low-specification image output mode, the target camera has a higher image output frame rate and/or image output quality in the high-specification image output mode. For example, in the high-specification image output mode, an image output specification of the target camera is an image resolution 640*320 and is a grayscale image, and an image output frame rate is 10 fps.

In the low power consumption mode, sub-modes of different image output specifications correspond to different power consumption. For example, power consumption of the high-specification image output mode is higher than that of the low-specification image output mode. For example, the mobile phone may be in the low-specification image output mode by default. When detecting a hand or a face, the mobile phone considers that a low-power sensing service may be triggered, and therefore may switch to the high-specification mode to perform image capturing and recognition, to perform image recognition more quickly and accurately, so as to determine, based on a recognition result, whether to trigger the low-power sensing service.

Figure 6D:
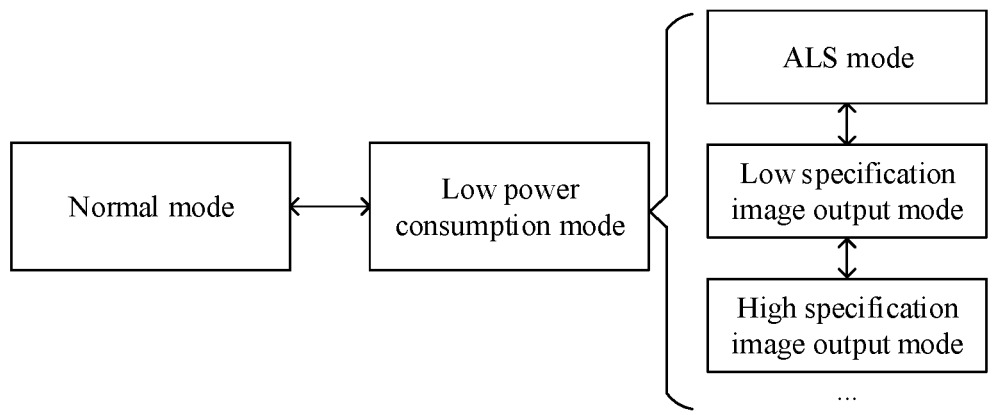
FIG. 6D is another schematic diagram of mode classification of a target camera according to an embodiment of this application.
Figure 6E:
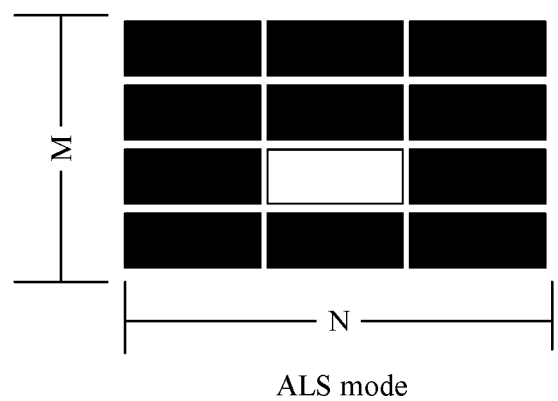
FIG. 6E is a schematic diagram of image block division according to an embodiment of this application.

In some other embodiments, refer to FIG. 6D. The low power consumption mode further includes another sub-mode, namely, an ambient light sensing (ambient light sensing, ALS) mode. In the ALS mode, the photosensitive element in the target camera is divided into M*N area blocks. Correspondingly, as shown in FIG. 6E, an image output by the target camera is also divided into M*N image blocks, and an image output frame rate is low, for example, 1 fps or 2 fps. The mobile phone may continuously monitor a light change of each area block, that is, continuously monitor a luminance change of each image block. When a luminance change degree of the image block is greater than a preset threshold, the mobile phone switches to another sub-mode of the low power consumption mode.

Compared with another sub-mode, in the ALS mode, power consumption of the mobile phone is low and an image recognition algorithm such as gesture recognition, facial recognition, user posture recognition, or environment recognition is not run, so that the mobile phone can be prevented from continuously running the image recognition algorithm for a long time in the low power consumption mode, thereby reducing power consumption of the mobile phone. In the low power consumption mode, a sensor is in the ALS mode by default, and the ALS mode and another sub-mode may be switched based on a scenario requirement, so that power consumption of the mobile phone matches a current scenario requirement, thereby reducing unnecessary power consumption and saving power consumption of the mobile phone as much as possible.

After a corresponding preset condition is met, the mobile phone switches to capture the first image based on different sub-specifications by using different sub-configuration parameters of the first configuration parameter in the low power consumption mode. For example, the low power consumption mode includes three sub-modes: an ALS mode, a low-specification image output mode, and a high-specification image output mode, and each sub-mode corresponds to a different sub-configuration parameter and a different sub-specification in the first image output specification. The target camera is in the ALS mode by default. When some preset conditions are met, the target camera switches from the ALS mode to the low-specification image output mode. Subsequently, the target camera may further switch from the low-specification image output mode to the high-specification image output mode based on the preset conditions, to gradually improve image output quality or an image output frame rate, and improve algorithm accuracy. When some other preset conditions are met, the high-specification image output mode may also be switched to the low-specification image output mode or the ALS mode, and the low-specification image output mode may also be switched back to the ALS mode, so as to gradually reduce image output quality or an image output frame rate, thereby reducing power consumption of the mobile phone. In this way, the mobile phone may determine, based on an actual scenario requirement, a sub-mode to be entered, so as to run a related algorithm as required, thereby reducing power consumption of the mobile phone as much as possible and saving power of the mobile phone.

Figure 7:
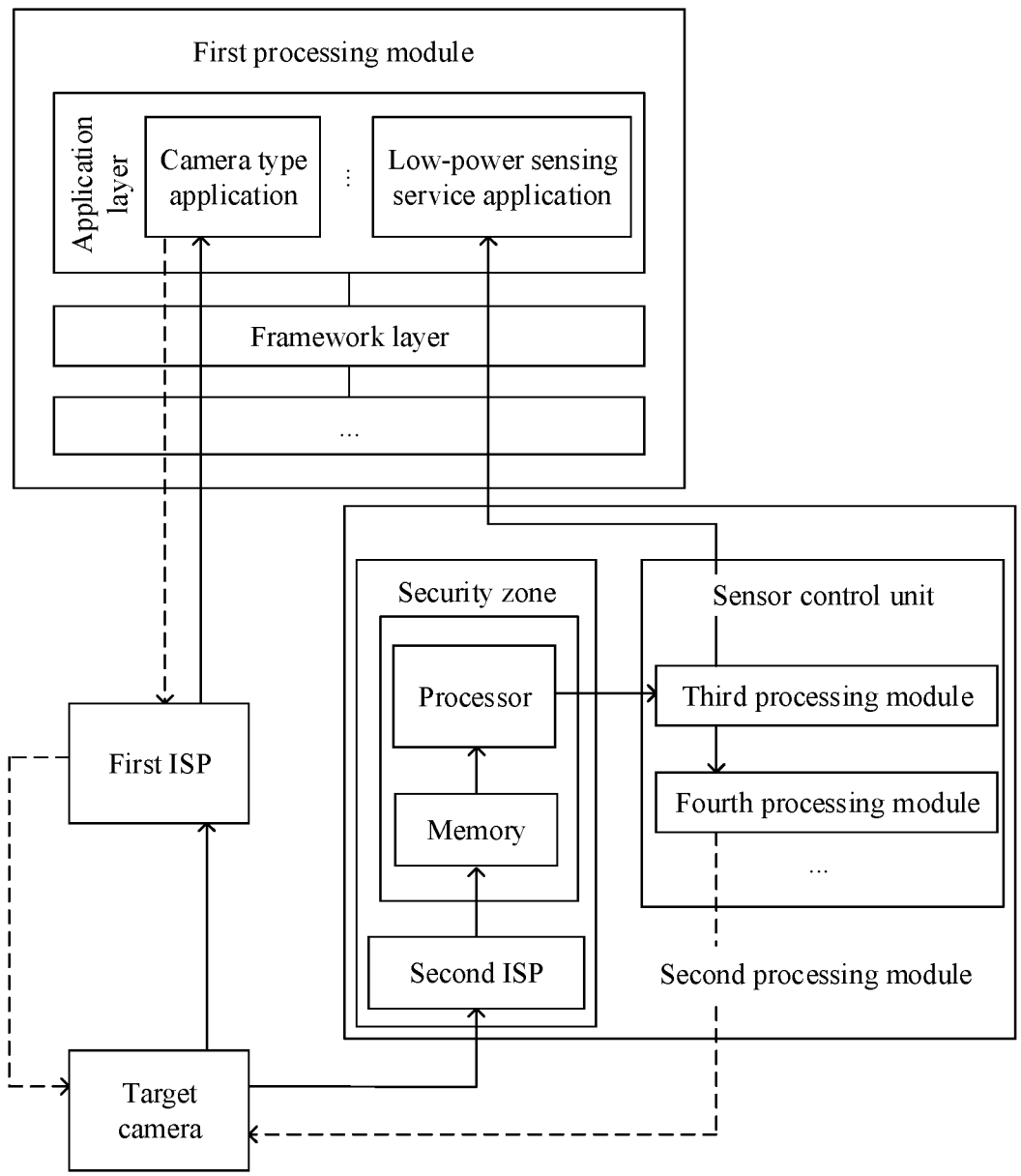
FIG. 7 is an architectural diagram of another low-power service sensing system according to an embodiment of this application.

In some embodiments of this application, the second ISP in the security zone in embodiments of this application may be configured to determine an image luminance change in the ALS mode. The processor in the security zone may be configured to run an image recognition algorithm such as gesture recognition, facial recognition, user posture recognition, or environment recognition in the low-specification image output mode or the high-specification image output mode. The second ISP may be always on, and the processor in the security zone is not always on, but is enabled only in the low-specification image output mode or the high-specification image output mode. Refer to FIG. 7. The sensor control unit in embodiments of this application may further include a fourth processing module. The fourth processing module is configured to determine and control switching between different sub-modes in the low power consumption mode based on the second processing result in the third processing module, and notify the target camera to switch between the corresponding sub-modes.

Figure 8:
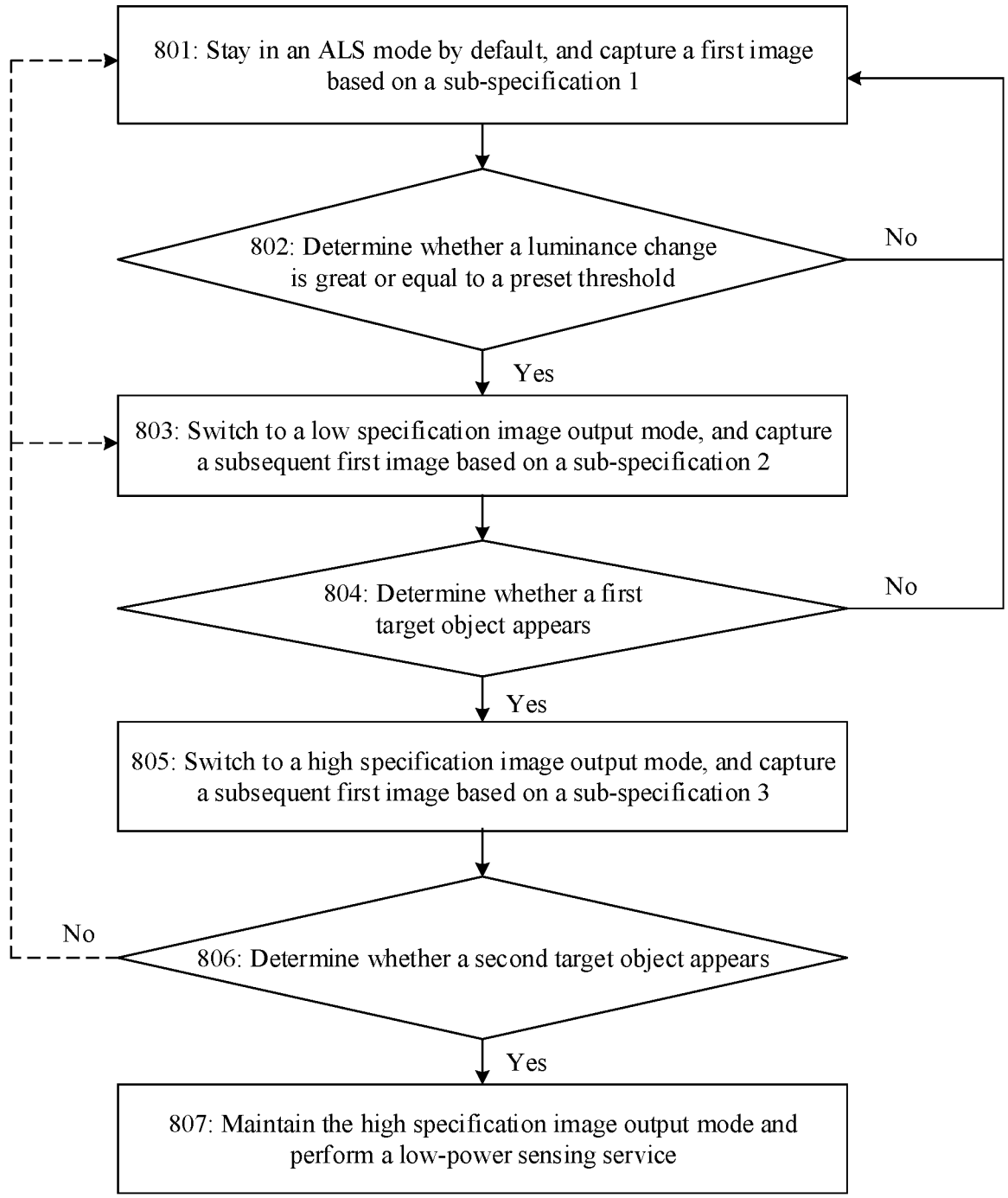
FIG. 8 is a schematic diagram of switching between sub-modes in a low power consumption mode according to an embodiment of this application.

The following describes, from a perspective of modules shown in FIG. 7, a process of switching between the sub-modes in the low power consumption mode based on a preset condition by using an example in which the low power consumption mode includes an ALS mode, a low-specification image output mode, and a high-specification image output mode. Refer to FIG. 8. The process of switching between the sub-modes may include the following steps.

801: The target camera is in the ALS mode by default, and captures the first image by using a sub-configuration parameter corresponding to the ALS mode and the sub-specification 1.

In the ALS mode of the low power consumption mode, the target camera captures the first image by using a sub-configuration parameter corresponding to the ALS mode, where the first image corresponds to the sub-specification 1. The target camera sends the first image data corresponding to the first image to the second ISP in the security zone through the first data transmission channel, and the second ISP determines whether the image luminance change is greater than or equal to a preset threshold. The image recognition algorithm in the processor of the security zone is not run temporarily.

802: In the low power consumption mode, the second ISP detects whether the image luminance change is greater than or equal to the preset threshold; and if yes, step 803 is performed, or if no, the target camera remains in the ALS mode.

In the low power consumption mode, the second ISP may determine whether a condition that the image luminance change is greater than or equal to the preset threshold is met, and then perform corresponding steps separately based on different determining results.

803: If the image luminance change is greater than or equal to the preset threshold, the target camera switches to the low-specification image output mode, and captures a subsequent first image based on the sub-specification 2 by using a sub-configuration parameter corresponding to the low-specification image output mode.

When the second ISP determines that the luminance change of the image from the target camera is greater than or equal to the preset threshold, the second ISP notifies, through the second control channel, the target camera to switch to the low-specification image output mode, and captures the first image by using a sub-configuration parameter corresponding to the low-specification image output mode. The first image corresponds to the sub-specification 2, and the sub-specification 2 is higher than the sub-specification 1.

There may be a plurality of cases in which the image luminance change is greater than or equal to the preset threshold. For example, data of an image block whose luminance is greater than or equal to a preset value 1 is greater than or equal to a preset quantity value 1. For another example, a quantity of image blocks whose luminance change threshold is greater than or equal to a preset value 2 is greater than or equal to a preset quantity value 2.

804: In the low-specification image output mode, the security zone and the sensor control unit detect whether a first target object appears on the image; and if yes, perform step 805; or if no, the target camera switches to the ALS mode.

In the low power consumption mode, the security zone and the sensor control unit may determine whether a condition of recognizing the first target object from the image is met, and then perform corresponding steps based on different determining results.

805: The target camera switches to the high-specification image output mode, and captures a subsequent first image based on the sub-specification 3 by using a sub-configuration parameter corresponding to the high-specification image output mode.

The first target object may be a preset object such as a face, a hand, a scenic spot, or an object (for example, an airplane, a train, or a cup). A specific type of the first target object is not limited in embodiments of this application.

In the low-specification image output mode, the processor in the security zone starts to run the image recognition algorithm. The target camera outputs the first image data based on an image output specification corresponding to the low-specification image output mode, where the first image data reaches the processor in the security zone by using the second ISP. The processor in the security zone runs the image recognition algorithm, to detect whether the first target object appears on the image. The processor sends the image recognition result to the third processing module.

In the low-specification image output mode, if the third processing module determines that the first target object does not appear on the image, it may be considered that the current scenario is not a scenario that the low-power sensing service is concerned with. Therefore, the fourth processing module notifies, through the second control channel, the target camera to switch to the ALS mode, to reduce power consumption of the mobile phone.

In the low-specification image output mode, if the third processing module determines that the first target object appears on the image, it may indicate that the current scenario is a scenario that the low-power sensing service is concerned with, and the user may want to use the mobile phone to process some low-power sensing services. The target camera may frequently capture images to perform image recognition more quickly and accurately, so as to determine, based on a recognition result, whether to trigger the low-power sensing service. Therefore, the fourth processing module notifies, through the second control channel, the target camera to switch to the high-specification image output mode, so as to capture the first image by using the sub-configuration parameter corresponding to the high-specification image output mode, where the first image corresponds to the sub-specification 3, and the sub-specification 3 is higher than the sub-specification 2.

806: In the high-specification image output mode, the security zone and the sensor control unit detect whether a second target object appears on the image; and if yes, perform step 807; or if no, the target camera switches to the low-specification image output mode or the ALS mode.

In the low power consumption mode, the security zone and the sensor control unit may determine whether a condition of recognizing the second target object from the image is met, and then perform corresponding steps based on different determining results.

807: The target camera maintains the high-specification image output mode, and the third processing module sends a processing result to the low-power sensing service application in the first processing module, to perform low-power sensing service processing.

The second target object may be a preset object that the user is interested in or a preset user input that the device needs to pay attention to, for example, a preset gesture or a user gaze. A specific type of the second target object is not limited in embodiments of this application.

In the high-specification image output mode, the target camera outputs the first image data based on an image output specification corresponding to the high-specification image output mode, and the first image data reaches the processor in the security zone by using the second ISP. The processor in the security zone runs the image recognition algorithm, to detect whether the second target object appears on the image. The processor sends the image recognition result to the third processing module.

In the high-specification image output mode, if the third processing module determines that the second target object does not appear on the image, it may be considered that an object concerned by the low-power sensing service does not appear currently, and the user may not want to trigger the low-power sensing service. Therefore, the fourth processing module notifies, through the second control channel, the target camera to switch to the low-specification image output mode, so as to reduce power consumption of the mobile phone.

In a high frame rate image output mode, if the third processing module determines that the second target object appears on the image, it may indicate that the object concerned by the low-power sensing service currently appears, the target camera maintains the high frame rate image output mode, and the third processing module sends the processing result to the low-power sensing service application in the first processing module for service processing.

It may be understood that the first image herein is a series of images captured by the target camera in the low power consumption mode based on different sub-specifications (for example, the sub-specification 1, the sub-specification 2, or the sub-specification 3) in the first image output specification, and is not only a frame of image. At different moments in the low power consumption mode, first images captured by the target camera are different.

In addition, in some embodiments of this application, the mobile phone may further prompt the user of a current operation mode of the target camera in a manner such as interface display, voice broadcast, vibration, or an indicator. For example, if the target camera is a front-facing primary camera, the mobile phone may display text prompt information on an interface, such as "the front-facing primary camera entered a low power consumption mode", "the front-facing primary camera entered an ALS mode", "the front-facing primary camera entered a low-specification image output mode", or "the front-facing primary camera entered a high-specification image output mode".

Figure 9A:
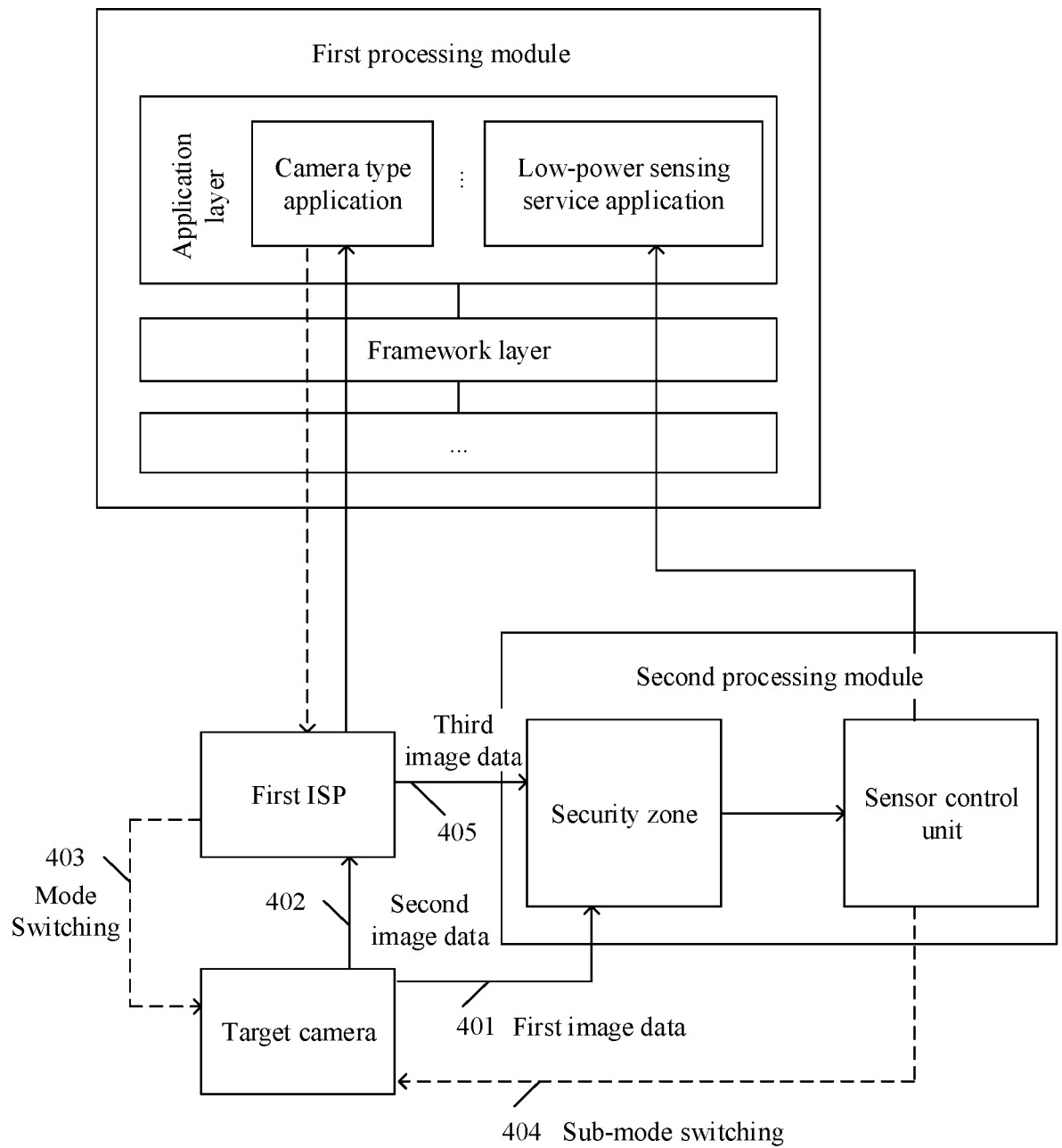
FIG. 9A is an architectural diagram of another low-power service sensing system according to an embodiment of this application.

In some other embodiments of this application, refer to an architectural diagram of another low-power service sensing system shown in FIG. 9A. A secure signal channel 405 is established between a first ISP and a security zone after security authentication succeeds. After security authentication between the first ISP and the security zone succeeds, in a normal mode of a target camera, the first ISP sends a second image data from the target camera to a camera type application for processing. In addition, the first ISP may further process a second image from the target camera to obtain a third image, and send third image data corresponding to the third image (which may also be understood as that the first ISP obtains the third image data after processing the second image data) to the security zone through the signal channel. In this way, channel multiplexing of a transmission channel of image data obtained by the target camera in the normal mode is implemented. In this way, in the normal mode, when a user uses the target camera to perform a camera type service such as photographing, video recording, or video call, a mobile phone may still implement a function of a first low-power sensing sensor by using the security zone and a sensor control unit based on an image captured by the target camera.

It should be noted that, because the second image is not only one frame of image, but a series of images captured based on a second image output specification, the third image is not only one frame of image, but includes images obtained by separately processing different second images.

However, in the normal mode shown in FIG. 4A, when the user uses the target camera to perform the camera type service such as photographing, video recording, or video call, because the target camera is occupied, the mobile phone still cannot implement the function of the first low-power sensing sensor by using the security zone and the sensor control unit based on image data obtained by the target camera. It should be noted that, a processing procedure in a low power consumption mode and a switching procedure between the low power consumption mode and the normal mode of the mobile phone in the case shown in FIG. 9A are consistent with the processing procedure in the case shown in FIG. 4A. Details are not described herein again.

Figure 9B:
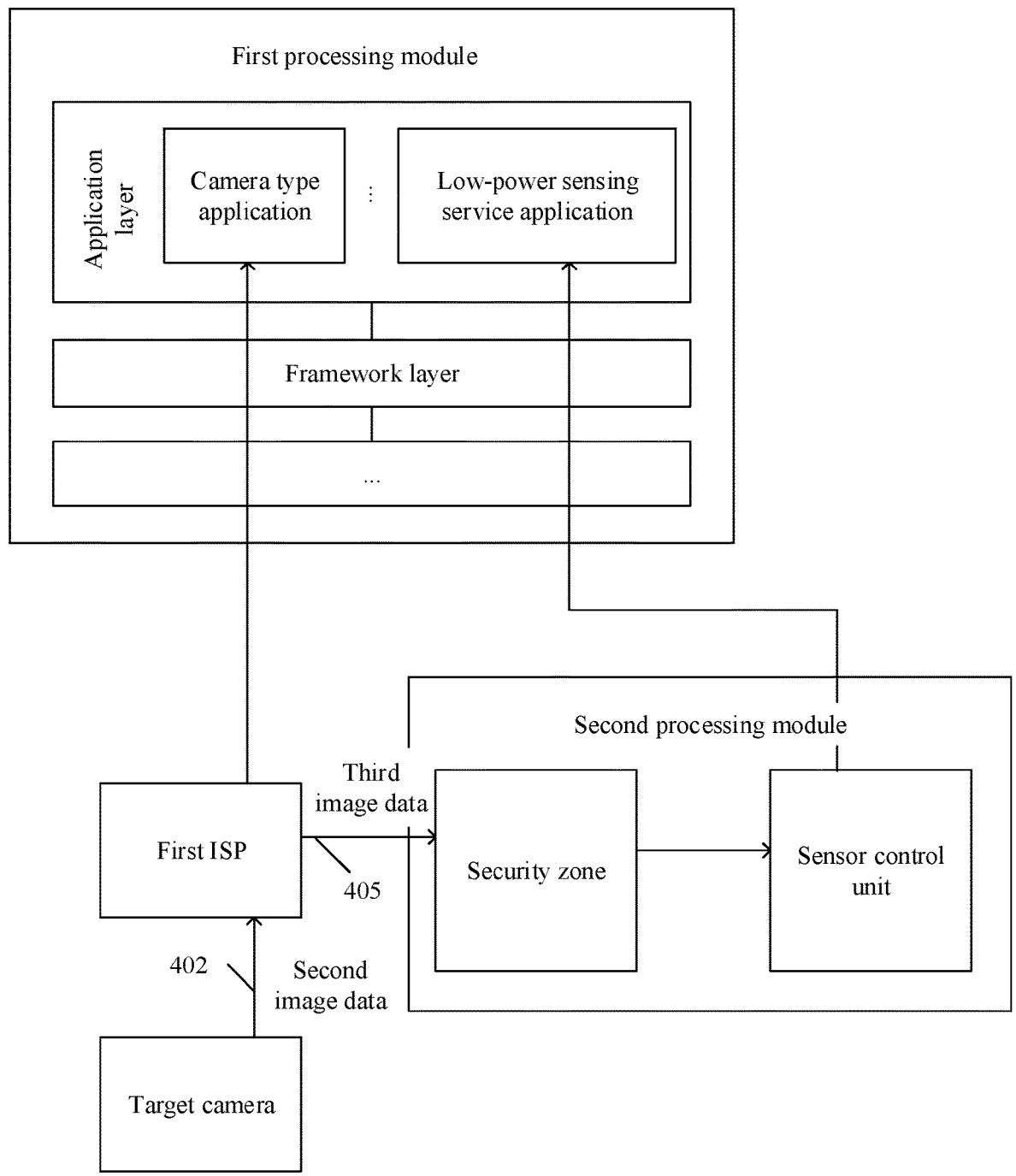
FIG. 9B is a schematic diagram of a data flow direction in a normal mode according to an embodiment of this application.
Figure 9C:
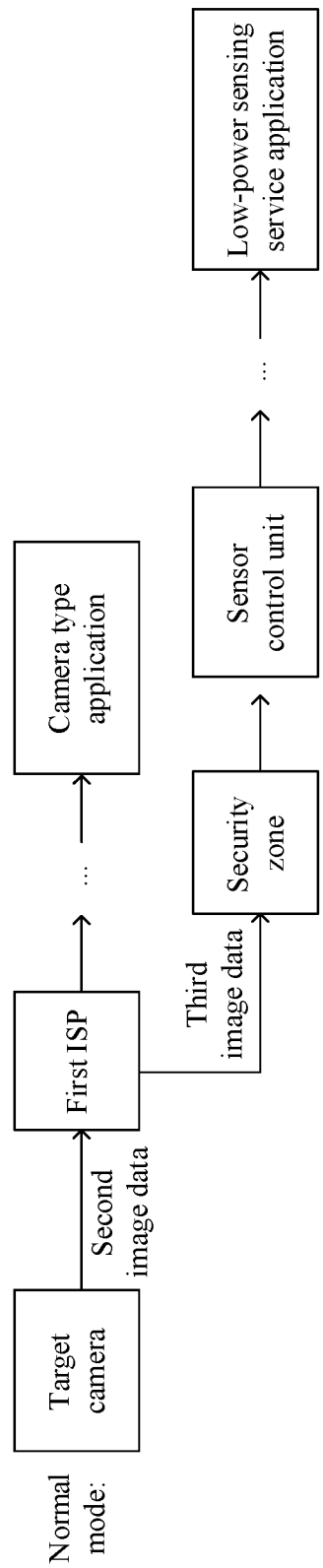
FIG. 9C is a schematic diagram of another data flow direction in a normal mode according to an embodiment of this application.

In the normal mode in the case shown in FIG. 9A, refer to schematic diagrams of data flows shown in FIG. 9B and FIG. 9C. The second image data obtained by the target camera by capturing the second image is sent to the first ISP, and the first ISP performs inter-core communication with the security zone, so as to process the obtained second image and send a processed second image to a camera type application in a first processing module, to perform a camera type service such as photographing, video recording, or video call. As shown in FIG. 9B and FIG. 9C, after processing the second image from the target camera to obtain the third image of a third image output specification, the first ISP further sends the third image data corresponding to the third image to the security zone, so that the security zone performs image processing and sends processed third image data to the sensor control unit, and then sends the third image data to an upper-layer low-power sensing service application, so as to perform low-power sensing service processing. It may also be understood that the first ISP obtains the third image data after processing the second image data, and sends the third image data to the security zone, and the third image data corresponds to the third image output specification.

Considering that a processing capability of the security zone is limited, and considering a problem of reducing power consumption, the first ISP may reduce a specification of an image from the target camera and then send the image to the security zone. For example, the first ISP may perform processing such as extracting the image from the target camera to reduce an image frame rate, and performing downsampling to reduce image resolution, performing cropping to reduce an image size, or converting a color image into a grayscale image. The second image data is data of an image with a high specification from the target camera, and the third image data is data of an image whose quality is reduced. In other words, the third image output specification is lower than the second image output specification.

Figure 10:
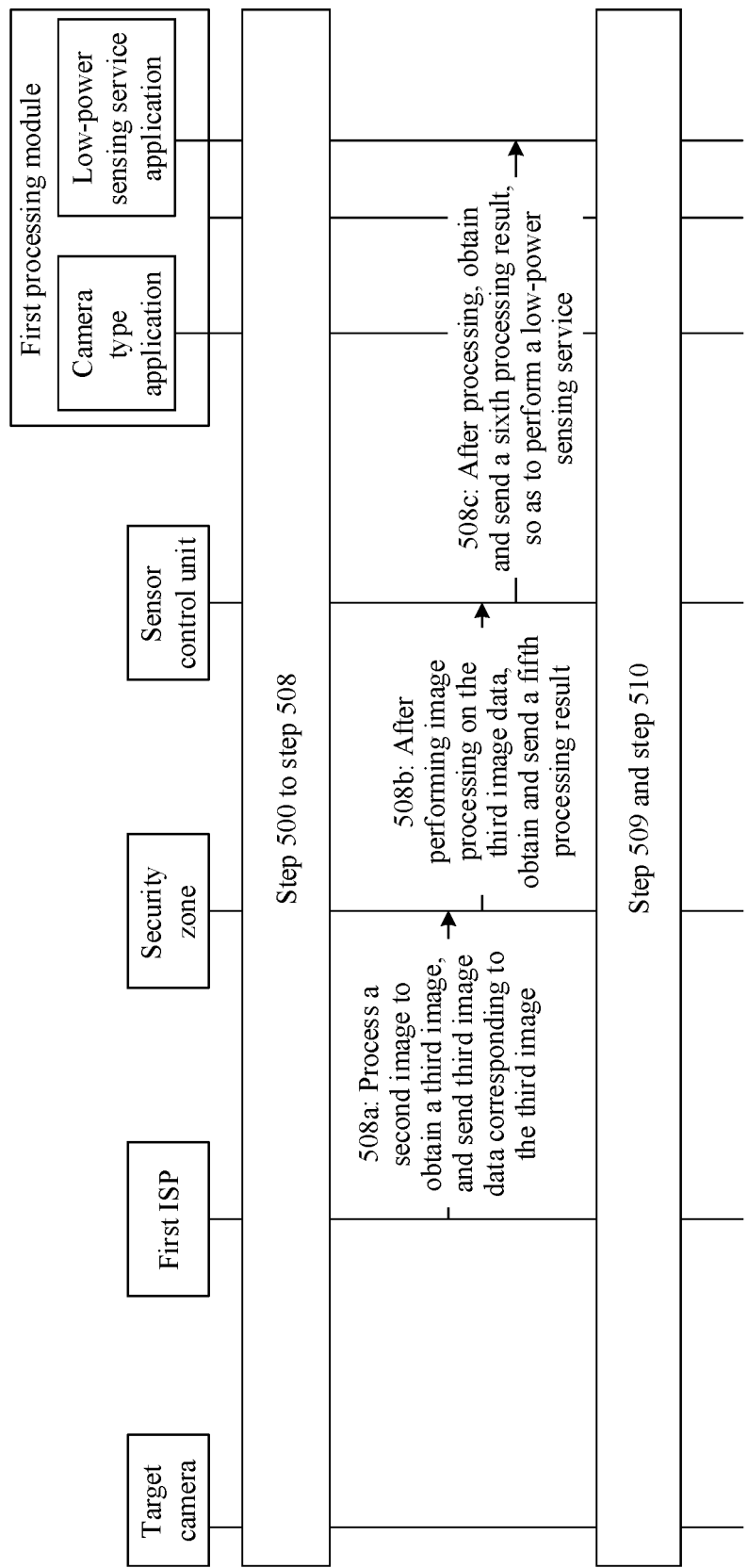
FIG. 10 is a flowchart of another service processing method according to an embodiment of this application.

In other words, in the case shown in FIG. 9A, after the normal mode is entered and before step 509 and step 510, refer to FIG. 10. The method further includes:

508a: The first ISP processes the second image to obtain the third image of the third image output specification, and sends third image data corresponding to the third image to the security zone.

For example, the third image output specification may be the same as a sub-specification 3 in the low power consumption mode, so that a second processing module may obtain the third image data based on the sub-specification 3 whose image output specification is higher (which is higher than a sub-specification 2 and a sub-specification 1) but lower than the second image output specification, so as to perform low-power sensing service processing based on the third image data.

508b: After performing image processing on the third image data, the security zone obtains a fifth processing result, and sends the fifth processing result to the sensor control unit.

508c: After processing the fifth processing result of one or more pieces of the third image data, the sensor control unit sends an obtained sixth processing result to a low-power sensing service application in the first processing module, so as to perform a corresponding low-power sensing service.

In the foregoing embodiments, in the normal mode shown in FIG. 9A, the third image data may be data of an image of a preset specification. For example, the third image data may be data of an image of an image output specification corresponding to a sub-mode in the low power consumption mode. For example, the third image data may be data of an image of an image output specification corresponding to a high-specification image output mode, so as to meet an image output specification requirement of each scenario in the low power consumption mode as much as possible.

Similar to the case shown in FIG. 5, in some other embodiments, in the case shown in FIG. 6B or FIG. 10, the mobile phone may not perform step 500 and step 501. After the mobile phone is powered on, the target camera is in the low power consumption mode by default, and captures the first image by using a preconfigured first configuration parameter by default based on the first image output specification. Alternatively, when the mobile phone is powered on for the first time, the mobile phone may perform step 500 and step 501, and configure the first configuration parameter in the target camera. Subsequently, after the mobile phone is powered on again, the target camera is in the low power consumption mode by default, and captures the first image by using the preconfigured first configuration parameter by default based on the first image output specification.

Figure 11:
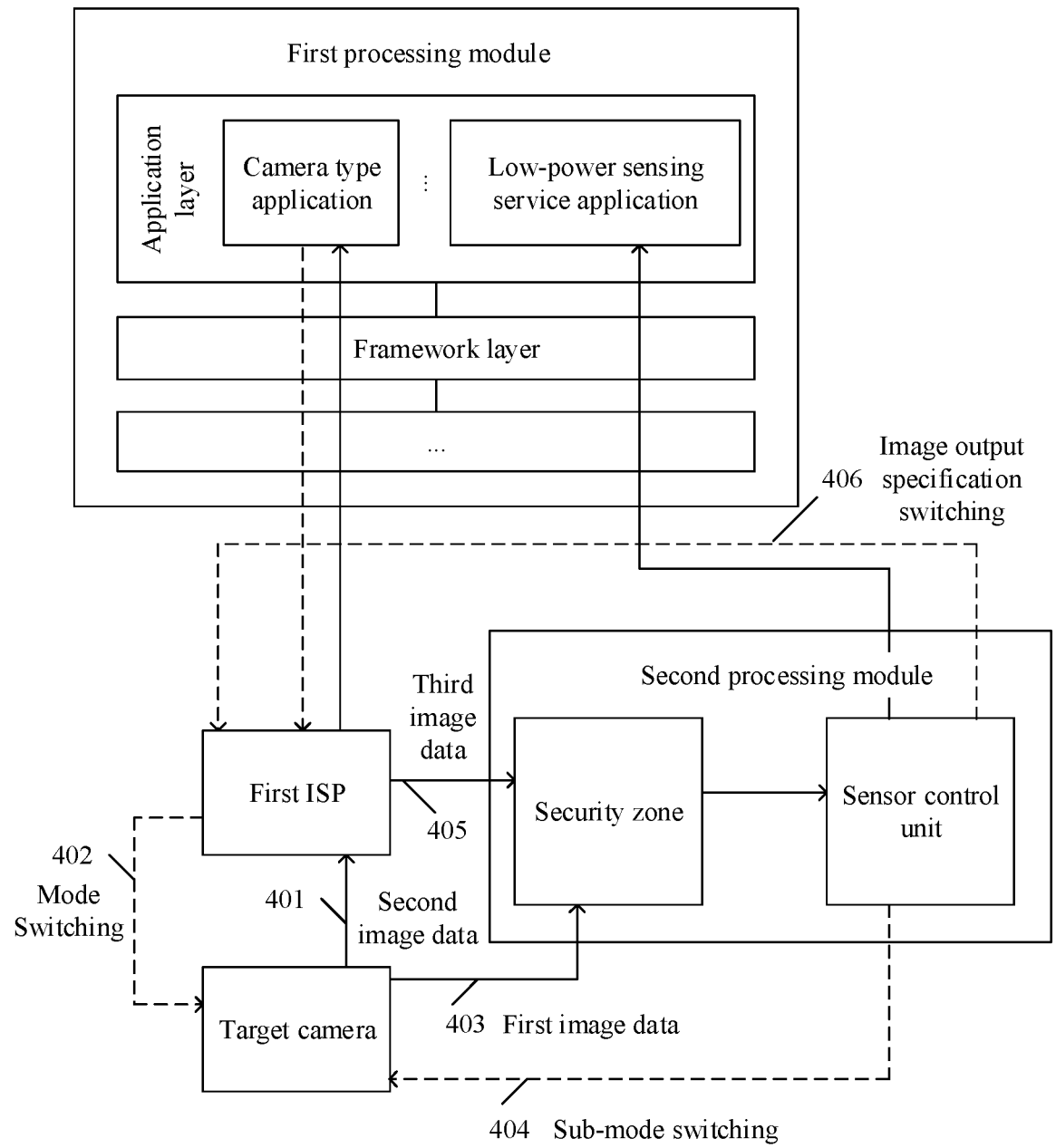
FIG. 11 is an architectural diagram of another low-power service sensing system according to an embodiment of this application.

In some other embodiments of this application, refer to FIG. 11. A third control channel 406 is further included between the sensor control unit and the first ISP, and is configured to switch, in the normal mode, a different sub-specification in the third image output specification corresponding to the third image data sent by the first ISP to the security zone. The third image output specification is lower than the second image output specification. For example, the third image output specification includes a sub-specification 4, a sub-specification 5, and a sub-specification 6. In this way, when the target camera operates in the normal mode, third image data of different sub-specifications with low image output specifications may still be provided for the low-power sensing service based on an actual scenario requirement, so that actual power consumption matches the actual scenario requirement, power consumption of the mobile phone in the normal mode is reduced as much as possible, and power of the mobile phone is saved. Particularly, when the target camera is used in the normal mode for a long time, a power consumption gain of the solution shown in FIG. 11 is more obvious.

The third image output specification may be the same as or different from the first image output specification. For example, when the target camera operates in the normal mode, the third image output specification is the same as the first image output specification, and the third image output specification also includes the sub-specification 1, the sub-specification 2, and the sub-specification 3 respectively corresponding to an ALS mode, a low-specification image output mode, and a high-specification image output mode. The sub-specification 4 is the same as the sub-specification 1, the sub-specification 5 is the same as the sub-specification 2, and the sub-specification 6 is the same as the sub-specification 3. When the target camera operates in the normal mode, after the first ISP sends the third image data to the second processing module, the sensor control unit in the second processing module may determine whether to switch the sub-specification. If the sub-specification needs to be switched, the sensor control unit may notify the first ISP. The first ISP processes the second image subsequently captured based on the second image output specification, so as to obtain the third image meeting a switched sub-specification and the third image data.

For example, when the target camera operates in the normal mode, the third image output specification that is corresponding to the third image data and that is sent by the first ISP to the security zone is, by default, the sub-specification 1 corresponding to the ALS mode in the low power consumption mode, so as to reduce power consumption of the mobile phone. After processing the third image data, the security zone sends a processing result to a third processing module in the sensor control unit, and the third processing module sends the processing result to a fourth processing module in the sensor control unit. When determining, based on the processing result of the third module, that the image output specification needs to be increased, the fourth processing module notifies, through the third control channel, the first ISP to send, to the security zone, the third image data corresponding to the sub-specification 2 of the low-specification image output mode in the low power consumption mode. Subsequently, the third image output specification may also be switched between the sub-specification 1, the sub-specification 2, and the sub-specification 3. The process is similar to the switching between different sub-modes and the corresponding sub-specification 1, sub-specification 2, and sub-specification 3 in the low power consumption mode. Details are not described herein again. For example, for a switching procedure of different sub-specifications in the third image output specification, refer to switching procedures of sub-modes and sub-specifications shown in FIG. 8.

In this way, when the target camera operates in the normal mode, the third image data corresponding to the ALS mode in the low power consumption mode, the third image data corresponding to the low-specification mode in the low power consumption mode, or the third image data corresponding to the high-specification mode in the low power consumption mode may still be provided for the low-power sensing service based on an actual scenario requirement, so that actual power consumption matches an actual scenario requirement, power consumption of the mobile phone in the normal mode is reduced as much as possible, and power of the mobile phone is reduced.

Figure 12:
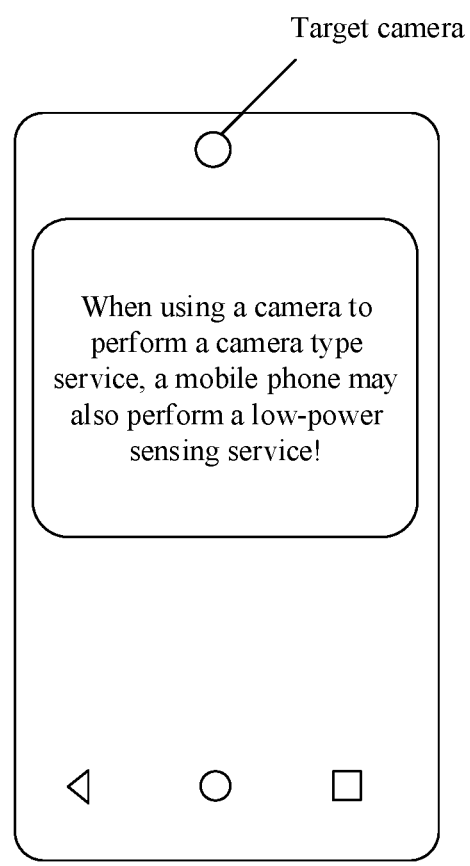
FIG. 12 is a schematic diagram of an interface prompt according to an embodiment of this application.

In some embodiments, in the architectural diagram shown in FIG. 9A or FIG. 11, the mobile phone may further prompt the user in a manner such as interface display, voice broadcast, vibration, or an indicator. In the normal mode, the mobile phone may implement both a camera type service and a low-power sensing service based on the target camera. For example, refer to FIG. 12. Each time the mobile phone enters the normal mode, or after the mobile phone enters the normal mode for the first time, or when the mobile phone guides the user to use the mobile phone after the mobile phone is powered on for the first time, or in other cases, the mobile phone may display text information: The mobile phone may further perform a low-power sensing service while performing a camera type service by using a camera.

In some embodiments, the first ISP may run corresponding control code to send the third image data to the security zone in the normal mode. In some other embodiments, a camera daemon process runs in the first processing module. The camera daemon process may run corresponding control code, to notify the first ISP to send the third image data to the security zone in the normal mode.

In this way, after the first low-power sensing sensor is integrated with the target camera, when the mobile phone normally processes a service such as photographing, video recording, or video call by using the target camera in the normal mode, the mobile phone may further normally perform the low-power sensing service based on the target camera.

In addition, the security zone may store some private data of the user. Therefore, the security zone should be an important, protected, and secure area. Security authentication is to enable the first ISP and the security zone to confirm that each other is secure, so that the security zone receives data from the first ISP, thereby preventing the security zone from being forcibly injected with data and from crashing due to attacks, and therefore cannot work normally.

There may be a plurality of security authentication manners between the first ISP and the security zone, for example, security authentication based on a public key and a private key, token-based authentication, or authorization-based authentication. This is not limited in embodiments of this application. Security authentication may be performed once between the first ISP and the security zone after the normal mode of the target camera is entered for the first time, or security authentication may be performed once each time the normal mode is entered, or security authentication may be performed periodically. An occasion of security authentication is not limited in embodiments of this application.

The service processing method provided in embodiments of this application is described above by using an example in which the electronic device is a mobile phone. When the electronic device is another device such as a tablet computer or a watch, the foregoing method may still be used to reduce power consumption of the electronic device. Details are not described herein.

It may be understood that, to implement the foregoing functions, the electronic device includes a corresponding hardware and/or software module for performing each function. With reference to algorithm steps in the examples described with reference to embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into function modules based on the foregoing method examples, for example, each function module may be obtained through division based on each corresponding function, or two or more functions may be integrated into one processing module. The integrated module may be implemented in a form of hardware. It should be noted that, in embodiments, division into modules is an example and is merely logical function division. During actual implementation, there may be another division manner.

An embodiment of this application further provides an electronic device. The electronic device includes: one or more cameras, configured to capture an image; one or more processors; a memory; and one or more computer programs. The one or more computer programs are stored in the memory. The one or more computer programs include instructions, and when the instructions are executed by the electronic device, the electronic device is enabled to perform the foregoing related method steps to implement the service processing method in the foregoing embodiments.

An embodiment of this application further provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the service processing method in the foregoing embodiments.

An embodiment of this application further provides a computer-readable storage medium. The computer-readable storage medium stores computer instructions. When the computer instructions are executed on an electronic device, the electronic device is enabled to perform the foregoing related method steps to implement the service processing method in the foregoing embodiments.

An embodiment of this application further provides a computer program product. When the computer program product is run on a computer, the computer is enabled to perform the foregoing related steps, to implement the service processing methods performed by the electronic device in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the service processing method performed by the electronic device in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented based on a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the method described in embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. An electronic device, comprising: a target camera and a first processor, wherein the first processor runs an application of a first service and an application of a second service; and the target camera is configured to:
capture, based on a first image output specification, an image for processing the first service, wherein the first image output specification is a default image output specification of the target camera, and the first image output specification corresponds to a first parameter used by the target camera to capture the image for processing the first service; and after the second service starts, capture, based on a second image output specification, an image for processing the second service, wherein the second image output specification corresponds to a second parameter used by the target camera to capture the image for processing the second service, wherein the second image output specification is higher than the first image output specification, and wherein the second service comprises photographing, video recording, or video calling.

2. The electronic device according to claim 1, wherein the target camera is further configured to:
after the second service ends, capture the image based on the first image output specification.

3. The electronic device according to claim 1, wherein the electronic device further comprises a first image signal processor (ISP);
the target camera is further configured to: after the second service starts, send the image captured based on the second image output specification to the first ISP; and
the first ISP is configured to: send the image captured based on the second image output specification to the first processor, and process the image captured based on the second image output specification to obtain an image satisfying a third image output specification, wherein the image satisfying the third image output specification is used to process the first service, and the second image output specification is higher than the third image output specification.

4. The electronic device according to claim 3, wherein the third image output specification is same as the first image output specification.

5. The electronic device according to claim 3, wherein the electronic device further comprises a second processor, the third image output specification comprises a sub-specification 4 and a sub-specification 5, and the sub-specification 5 is higher than the sub-specification 4, and wherein processing the image captured based on the second image output specification to obtain the image satisfying the third image output specification comprises:
performing first processing on the image captured based on the second image output specification to obtain an image satisfying the sub-specification 4;
sending the image satisfying the sub-specification 4 to the second processor; and
in response to the second processor determines, based on the image satisfying the sub-specification 4, that a first condition is satisfied, performing, by the first ISP, second processing on an image subsequently captured based on the second image output specification to obtain an image satisfying the sub-specification 5.

6. The electronic device according to claim 5, wherein the third image output specification further comprises a sub-specification 6, and the sub-specification 6 is higher than the sub-specification 5, and wherein processing the image captured based on the second image output specification to obtain the image satisfying the third image output specification comprises:
sending the image satisfying the sub-specification 5 to the second processor; and
in response to the second processor determines, based on the image satisfying the sub-specification 5, that a second condition is satisfied, performing, by the first ISP, third processing on an image subsequently captured based on the second image output specification to obtain an image satisfying the sub-specification 6; or
in response to the second processor determines, based on the image satisfying the sub-specification 5, that the second condition is not satisfied, performing, by the first ISP, first processing on an image subsequently captured based on the second image output specification to obtain an image satisfying the sub-specification 4.

7. The electronic device according to claim 6, wherein that the first ISP is configured to process the image captured based on the second image output specification to obtain an image satisfying a third image output specification further comprises:
sending the image satisfying the sub-specification 6 to the second processor; and
in response to the second processor determines, based on the image satisfying the sub-specification 6, that a third condition is satisfied, continuing, by the first ISP, to perform third processing on an image subsequently captured based on the second image output specification to obtain an image satisfying the sub-specification 6; or
in response to the second processor determines, based on the image satisfying the sub-specification 6, that the third condition is not satisfied, performing, by the first ISP, second processing on an image subsequently captured based on the second image output specification to obtain the image satisfying the sub-specification 5 or performing first processing on an image subsequently captured based on the second image output specification to obtain the image satisfying the sub-specification 4.

8. The electronic device according to claim 1, wherein the electronic device further comprises a second processor, the first image output specification comprises a sub-specification 1 and a sub-specification 2, the sub-specification 1 corresponds to a first sub-parameter used by the target camera to capture the image for processing the first service, the sub-specification 2 corresponds to a second sub-parameter used by the target camera to capture the image for processing the first service, and the sub-specification 2 is higher than the sub-specification 1, and wherein capturing the image based on the first image output specification comprises:
capturing an image based on the sub-specification 1;
sending the image captured based on the sub-specification 1 to the second processor; and
in response to the second processor determines, based on the image captured based on the sub-specification 1, that a first condition is satisfied, capturing, by the target camera, an image based on the sub-specification 2.

9. The electronic device according to claim 8, wherein the first image output specification further comprises a sub-specification 3, the sub-specification 3 corresponds to a third sub-parameter used by the target camera to capture the image for processing the first service, and the sub-specification 3 is higher than the sub-specification 2, and wherein capturing the image based on the first image output specification further comprises:
sending the image captured based on the sub-specification 2 to the second processor; and
in response to the second processor determines, based on the image captured based on the sub-specification 2, that a second condition is satisfied, capturing, by the target camera, an image based on the sub-specification 3; or in response to the second processor determines, based on the image captured based on the sub-specification 2, that the second condition is not satisfied, capturing, by the target camera, the image based on the sub-specification 1.

10. The electronic device according to claim 9, wherein capturing the image based on the first image output specification further comprises:

sending the image captured based on the sub-specification 3 to the second processor; and in response to the second processor determines, based on the image captured based on the sub-specification 3, that a third condition is satisfied, continuing, by the target camera, to capture the image based on the sub-specification 3; or in response to the second processor determines, based on the image captured based on the sub-specification 3, that the third condition is not satisfied, capturing, by the target camera, the image based on the sub-specification 2 or the sub-specification 1.

11. The electronic device according to claim 8, wherein the first condition comprises: an image luminance change is greater than or equal to a preset threshold.

12. The electronic device according to claim 9, wherein the second condition comprises recognizing a first target object from the image.

13. The electronic device according to claim 12, wherein the first target object comprises a face, a hand, a scenic spot, or an object.

14. The electronic device according to claim 10, wherein the third condition comprises recognizing a second target object from the image.

15. The electronic device according to claim 14, wherein the second target object comprises a preset gesture or a user gaze.

16. The electronic device according to claim 1, wherein a parameter related to the first or second image output specification comprises one or more of: a frame rate, resolution, or a channel quantity of an image.

17. The electronic device according to claim 1, wherein the first service comprises air gesture detection.

18. A service processing method, applied to an electronic device, wherein the electronic device comprises a target camera, and the method comprises:

capturing, based on a first image output specification, an image for processing a first service, wherein the first image output specification is a default image output specification of the target camera, and the first image output specification corresponds to a first parameter used by the target camera to capture the image for processing the first service; and after a second service starts, capturing, based on a second image output specification, an image for processing the second service, wherein the second image output specification corresponds to a second parameter used by the target camera to capture the image for processing the second service, wherein the second image output specification is higher than the first image output specification, and wherein the second service comprises photographing, video recording, or video calling.

19. A non-transitory computer-readable storage medium, comprising computer instructions executable by at least one processor to perform operations comprising:

capturing, using a target camera and based on a first image output specification, an image for processing a first service, wherein the first image output specification is a default image output specification of the target camera, and the first image output specification corresponds to a first parameter used by the target camera to capture the image for processing the first service; and after a second service starts, capturing, using the target camera and based on a second image output specification, an image for processing the second service, wherein the second image output specification corresponds to a second parameter used by the target camera to capture the image for processing the second service, wherein the second image output specification is higher than the first image output specification, and wherein the second service comprises photographing, video recording, or video calling.

* * * * *